(12) United States Patent
Tabet et al.

(10) Patent No.: US 9,935,742 B2
(45) Date of Patent: Apr. 3, 2018

(54) ADAPTIVE HARQ FOR HALF DUPLEX OPERATION FOR BATTERY AND ANTENNA CONSTRAINED DEVICES

(71) Applicant: Apple Inc., Cupertino, CA (US)

(72) Inventors: Tarik Tabet, Los Gatos, CA (US);
Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 14/867,089

(22) Filed: Sep. 28, 2015

(65) Prior Publication Data

US 2016/0112181 A1 Apr. 21, 2016

Related U.S. Application Data

(60) Provisional application No. 62/066,282, filed on Oct. 20, 2014, provisional application No. 62/069,787, filed on Oct. 28, 2014.

(51) Int. Cl.
*H04W 4/00* (2009.01)
*H04L 1/18* (2006.01)
(Continued)

(52) U.S. Cl.
CPC .......... *H04L 1/1812* (2013.01); *H04L 1/1822* (2013.01); *H04L 1/1825* (2013.01);
(Continued)

(58) Field of Classification Search
CPC combination set(s) only.
See application file for complete search history.

(56) References Cited

U.S. PATENT DOCUMENTS

| 8,958,364 B2 * | 2/2015 | Ostergaard ........ H04W 72/0426 370/310 |
| 2009/0204867 A1 | 8/2009 | Ho |

(Continued)

FOREIGN PATENT DOCUMENTS

| EP | 2026491 A1 | 2/2009 |
| WO | 2014153048 A1 | 9/2014 |

OTHER PUBLICATIONS

Invitation to Pay Additional Fees, International Application No. PCT/US2015/054325, dated Jan. 15, 2016, 9 pages.

*Primary Examiner* — Frank Duong
(74) *Attorney, Agent, or Firm* — Meyertons Hood Kivlin Kowert & Goetzel, P.C.; Jeffrey C. Hood; Brian E. Moore

(57) ABSTRACT

A user equipment (UE) implements improved communication methods which enable uplink (UL) transmissions consistent with an UL timeline. The UE may have a transmit duty cycle and may transmit acknowledge/negative acknowledge messages to a base station according to the transmit duty cycle. Additionally, the UE may be configured to determine signal-to-interference-plus noise ratio (SINR) between the UE and the base station and compare SINR to a threshold. The UE may transmit redundancy versions of data in consecutive sub-frames with a duty cycle of two transmissions per X+1 sub-frames if SINR is equal or above the threshold and redundancy versions using a duty cycle of one transmission per X sub-frames if SINR is below the threshold. Further, the UE may be configured to communicate a number of UL HARQ processes supported by the UE, receive first information in a first sub-frame, and send second information X sub-frames after the first sub-frame.

20 Claims, 16 Drawing Sheets

(51) Int. Cl.
*H04W 72/04* (2009.01)
*H04L 5/00* (2006.01)
*H04L 5/16* (2006.01)
*H04W 76/04* (2009.01)
*H04W 88/08* (2009.01)

(52) U.S. Cl.
CPC .......... *H04L 1/1854* (2013.01); *H04L 1/1896* (2013.01); *H04L 5/006* (2013.01); *H04L 5/0055* (2013.01); *H04L 5/16* (2013.01); *H04W 72/042* (2013.01); *H04W 72/0413* (2013.01); *H04W 76/048* (2013.01); *H04W 88/08* (2013.01)

(56) References Cited

U.S. PATENT DOCUMENTS

| | | | |
|---|---|---|---|
| 2011/0249601 A1* | 10/2011 | Seo | H04L 1/1819 370/310 |
| 2014/0161084 A1 | 6/2014 | Yang et al. | |
| 2015/0085720 A1 | 3/2015 | Gaal et al. | |
| 2016/0164643 A1* | 6/2016 | Loehr | H04L 1/1854 370/336 |

\* cited by examiner

| TTI # | 0 | 1 | 2 | ••• | X-1 | X | X+1 | ••• | 2X-1 | 2X | 2X+1 | ••• | 3X-1 | 3X | 3X+1 | ••• | 4X-1 | 4X | ••• |
|---|---|---|---|---|---|---|---|---|---|---|---|---|---|---|---|---|---|---|---|
| HARQ Process# | 0 | | | | 0 | | | | 0 | | | | 0 | | | | 1 | | |
| RV | 0 | | | | 2 | | | | 3 | | | | 1 | | | | 0 | | |
| ACK/NACK | | | | | | | | | | | | | | | NACK | | | | |

FIG. 16

ADAPTIVE HARQ FOR HALF DUPLEX OPERATION FOR BATTERY AND ANTENNA CONSTRAINED DEVICES

PRIORITY DATA

This application claims benefit of priority to U.S. Provisional Application Ser. No. 62/066,282, titled "Half Duplex Operation for Battery and Antenna Constrained Devices", filed Oct. 20, 2014 by Tarik Tabet and Syed Aon Mujtaba and U.S. Provisional Application Ser. No. 62/069,787, titled "Adaptive HARQ for Half Duplex Operation for Battery and Antenna Constrained Devices", filed Oct. 28, 2014 by Tarik Tabet and Syed Aon Mujtaba, which are hereby incorporated by reference in their entirety as though fully and completely set forth herein.

FIELD

The present application relates to wireless communication, and more particularly, adaptive hybrid automatic repeat request (HARQ) for half duplex operations for battery and antenna constrained devices in a radio access technology such as LTE.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, etc.

In cellular radio access technologies (RATs) such as LTE, the user equipment (UE) requests uplink (UL) resources by means of a scheduling request (SR). In response to a SR, the base station assigns UL resources to the UE with a UL grant. The base station can assign resources to the UE on every sub-frame. After the UE receives a UL grant, the UE can transmit data to the base station on the physical uplink shared channel (PUSCH).

Hybrid automatic repeat request (HARQ) is a technique used by a receiver to detect a corrupted message and to request a new message from the sender. In LTE frequency division duplexing (FDD) the UL HARQ is synchronous, i.e., if the UL grant for the initial transmission is received by the UE at t=0, the UL transmission on PUSCH occurs at t=4, the ACK/NACK feedback occurs on t=8 and the HARQ retransmission occurs on t=12. In order to obtain a grant, the UE sends a scheduling request (SR) to the base station (e.g., at t=0), and the base station will send a UL grant in the PDCCH at t>=4.

A device which is peak current limited (i.e., a device that has limited battery and/or limited power amplifier capability) may not able to transmit continuously in the UL, e.g., it can transmit only on a low duty cycle. A device may be peak current limited because of the size of its battery (e.g., the device may only have a finite amount of current that may be drawn from the batter) and/or because of the efficiency of its antenna (e.g., in order to maintain connectivity with the base station, the antenna's power amplifier may need to operate at maximum output). Additionally, a device may have restrictions similar to a peak current limited device because of half duplex frequency division duplex (FDD) operation (e.g., when concurrent transmit and receive is not supported).

For example, devices constrained due to battery size and/or antenna efficiency may transmit during one sub-frame and then may remain silent for the next 7 sub-frames for FDD transmissions and the next 9 sub-frames for time division duplexing (TDD) transmissions. Thus, as one common example, such a device may transmit only in one sub-frame per LTE radio frame. The duty cycle in the FDD case is 12.5% and in the TDD case is 10%.

A mechanism is needed to enable UL transmissions in such scenarios and to make sure that the UE may still transmit in the UL without violating the UL timeline. Therefore, improvements in the field would be desirable.

SUMMARY

Embodiments are presented herein of, inter alia, a user equipment (UE), base station (eNB), and improved communication methods which enable a UE that is peak current limited to maintain an uplink timeline.

Some embodiments relate to a user equipment device (UE) comprising at least one antenna, at least one radio, and one or more processors coupled to the radio. The at least one radio is configured to perform cellular communication using at least one radio access technology (RAT). The one or more processors and the at least one radio are configured to perform voice and/or data communications, as well as the methods described herein.

In some embodiments, the UE is configured to transmit first user data and a first acknowledge/negative acknowledge (ACK/NACK) in a first sub-frame subsequent to receiving first data from a base station Y sub-frames prior to the transmission of the first user data. The first ACK/NACK may correspond to the first data from the base station and the UE has a transmit duty cycle of X sub-frames, where X is greater than Y. Additionally, the UE is configured to transmit second user data and a second ACK/NACK in a second sub-frame subsequent to receiving second data from the base station Y sub-frames prior to transmission of the second user data. The second ACK/NACK may correspond to the second data from the base station. The second sub-frame is X sub-frames after the first sub-frame.

In another embodiment, the UE is configured to determine signal-to-interference-plus noise ratio (SINR) for a channel between the UE and a base station and compare the SINR to a threshold. When the SINR is greater than or equal to the threshold, the UE may transmit, in consecutive sub-frames, a first version and a second version of user data. Additionally, the UE may transmit, in consecutive sub-frames, a third version and a fourth version of user data. The transmission of the third version may occur X+1 sub-frames after transmission of the first version, where the UE may have a transmit duty cycle of X sub-frames. Additionally, when the SINR is less than the threshold, the UE may transmit the first version of the user data in a first sub-frame and transmit the second version of the user data in a second sub-frame and the second sub-frame may occur X sub-frames after the first sub-frame.

In some embodiments, the UE is configured to communicate, to a base station, a number of uplink (UL) hybrid automatic repeat request (HARQ) processes supported by the UE, receive first information from the base station in at least a first sub-frame, and send second information to the base station X sub-frames after the first sub-frame. The first information may correspond to at least a first downlink (DL)

HARQ process and a number of DL HARQ processes depends upon the number of UL HARQ processes. The second information may include a first ACK/NACK associated with the first DL HARQ process.

Some embodiments relate to a base station comprising a radio and a processing element operatively coupled to the radio. The radio and processing element are configured to perform wireless communication with a wireless device (e.g. a UE), as well as the methods described herein.

In some embodiments, the base station is configured to receive, from a wireless device, a number of uplink (UL) hybrid automatic repeat request (HARQ) processes supported by the wireless device, send first information to the wireless device in at least a first sub-frame, and receive second information to the base station X sub-frames after the first sub-frame. The first information corresponds to at least a first downlink (DL) HARQ process and a number of DL HARQ processes depends upon the number of UL HARQ processes. The second information includes a first ACK/NACK associated with the first DL HARQ process.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 16 illustrates a method for distributed TTI bundling, according to some embodiments.

Figure 1:
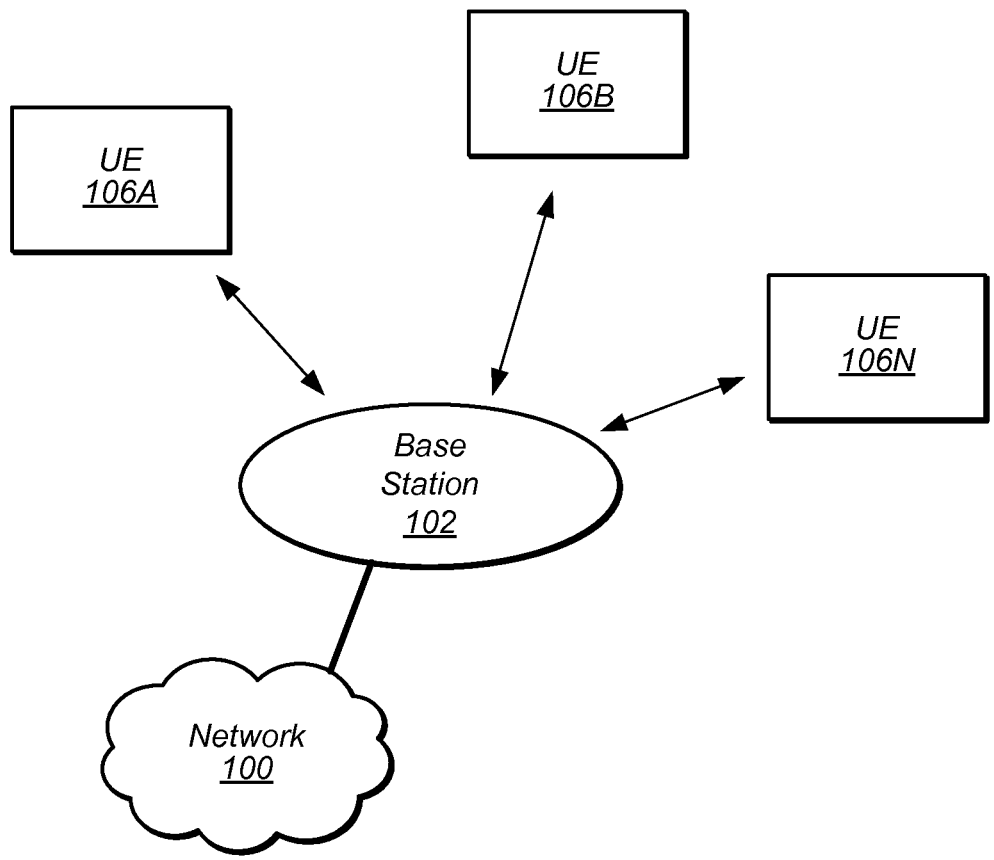
FIG. 1 illustrates an exemplary wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission
RX: Reception
UMTS: Universal Mobile Telecommunication System
LAN: Local Area Network
WLAN: Wireless LAN
RAT: Radio Access Technology

TERMINOLOGY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

FIG. 1—Wireless Communication System

FIG. 1 illustrates a wireless cellular communication system, according to some embodiments. It is noted that FIG.

1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
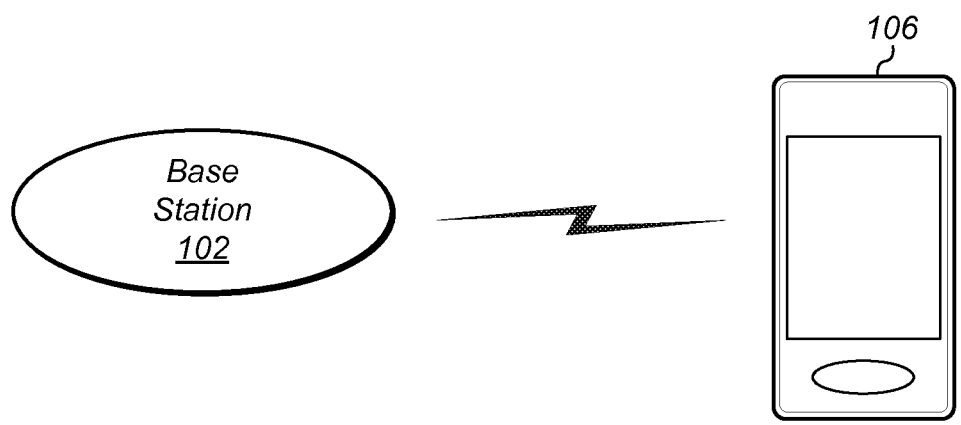
FIG. 2 illustrates a base station ("BS", or in the context of LTE, an "eNodeB" or "eNB") in communication with a wireless device, according to some embodiments.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
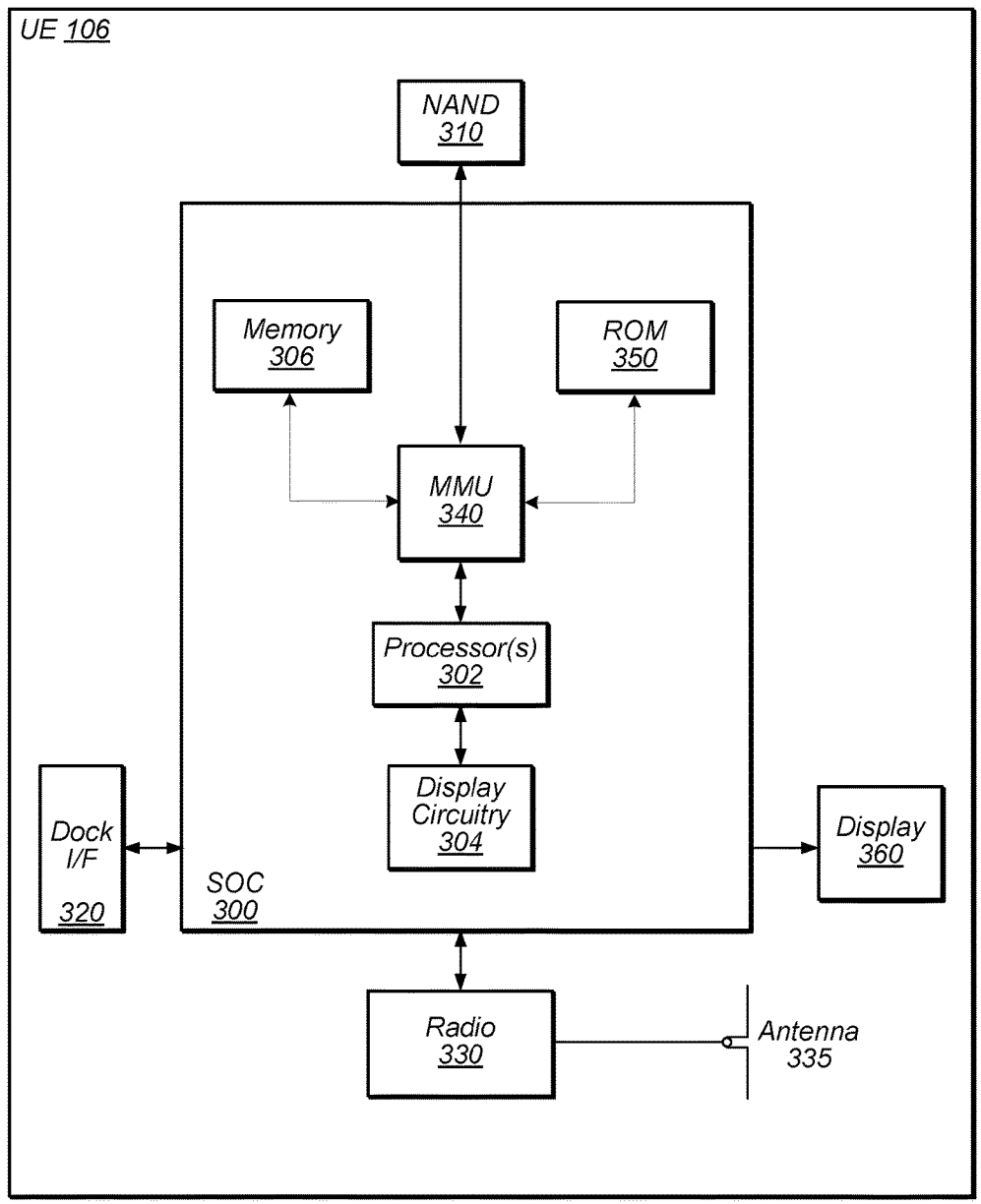
FIG. 3 illustrates a block diagram a wireless communication system, according to some embodiments.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 360, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 340, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
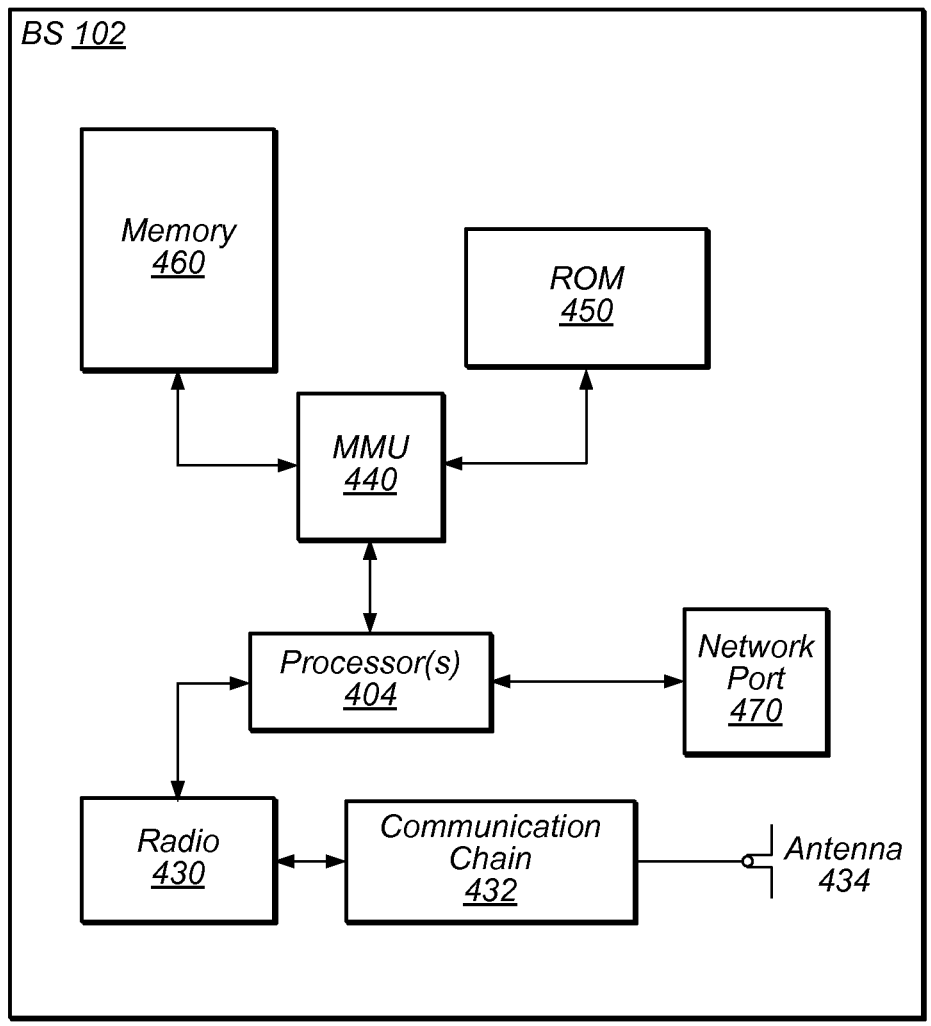
FIG. 4 illustrates a block diagram of a base station, according to some embodiments.

FIG. 4—Base Station

FIG. 4 illustrates a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) processor(s) 404 of the base station 102, in conjunction with one or more of the other components 430, 440, 450, 460, and 470 may be configured to implement part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information from the base station to the UE. The LTE downlink comprises a physical downlink shared channel (PDSCH), a physical downlink control channel (PDCCH), and a physical hybrid automatic repeat request (HARM) indicator channel (PHICH). The PDSCH is the downlink channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH. Further, the PHICH is the downlink channel that carries HARQ acknowledgments (ACK/NACK) for uplink data transfers.

LTE also defines a number of physical uplink channels to carry information from the UE to the base station. The LTE uplink comprises a physical uplink shared channel (PUSCH) and a physical uplink control channel (PUCCH). The PUSCH is the uplink counterpart to the PDSCH. The PUCCH provides the various control signaling requirements for uplink communications including carrying the channel quality indicator (CQI), the rank indicator (RI), and the pre-coding matrix indicator (PMI), as well as, HARQ acknowledgments (ACK/NACK).

As described above, in LTE the base station (eNB) assigns UL resources using the PDCCH, wherein this assignment of resources is called a UL grant. The UL grant may be a type of persistent UL grant such as a semi-persistent scheduling (SPS) UL grant. The persistent or semi-persistent UL grant may be configured by radio resource control (RRC) layer signaling and the UE may be configured with SPS by the base station, and then the base station may activate the UE to use SPS. Persistent or semi-persistent UL grants, such as SPS, allows for a persistent, periodic UL grant. Thus, the UE may transmit new information periodically without receiving a new UL grant for each transmission. Alternatively, the UL grant may be for a specified amount of information, and the base station may send additional UL grants based on scheduling requests from the UE.

TTI Bundling

In normal operations, a transport block is converted to multiple redundancy versions after coding and the first redundancy version is sent in a sub-frame. If this first redundancy version is not properly received, the receiver will return a negative acknowledge (NACK), which results in a hybrid automatic repeat request (HARQ), i.e., a retransmission of a new, typically different, redundancy version. One common type of automatic repeat request is HARQ (hybrid automatic repeat request). The HARQ ACK/NACK is sent 4 sub-frame durations or more after the first transmission. Thus in normal operations subsequent transmissions of the transport block, i.e., subsequent transmissions of another redundancy version, are dependent on non-receipt (NACK) of the first redundancy version that was transmitted.

TTI bundling is a technique used to send a transport block multiple times in consecutive sub-frames without waiting for HARQ ACK/NACK messages. In TTI bundling, a plurality of the redundancy versions can all be sent in consecutive (adjacent) sub-frames without waiting for the HARQ ACK/NACK feedback. In addition, a combined ACK/NACK can be sent after processing all the transmissions of a transport block, i.e., after all of the consecutive redundancy versions have been sent. One motivation for TTI bundling is the low transmission power of some handsets, short TTI length. TTI bundling is designed to improve the UL coverage of applications like VOIP over LTE wherein low power handsets are likely to be involved.

Thus, TTI bundling is used to achieve successful transmissions from power limited UEs and range limited UEs. The TTI bundling process, for these new types of devices might be triggered by the UE informing the base station about its current power limitations via radio resource control (RRC) layer signaling. For example, this situation may arise at the edge of a cell when the UE is required to transmit at high power, but where the UE has limited power capability. After the base station is notified about the UE's limited power capability, the UE may transmit the various redundancy versions of the same transport block in consecutive sub-frames or TTIs to the base station, giving rise to the name TTI bundling. These multiple consecutive transmissions may provide for reduced overhead. A single HARQ ACK/NACK for the combined transmissions is generated by the base station after processing the TTI bundle. The transmission of a TTI bundle, instead of merely a single redundancy version transmission, may reduce the error rate of the transport block. This approach can also reduce the delay in the HARQ process compared to transmissions of the redundancy versions separated in time using the normal (non-TTI bundling) approach.

Figure 5A:
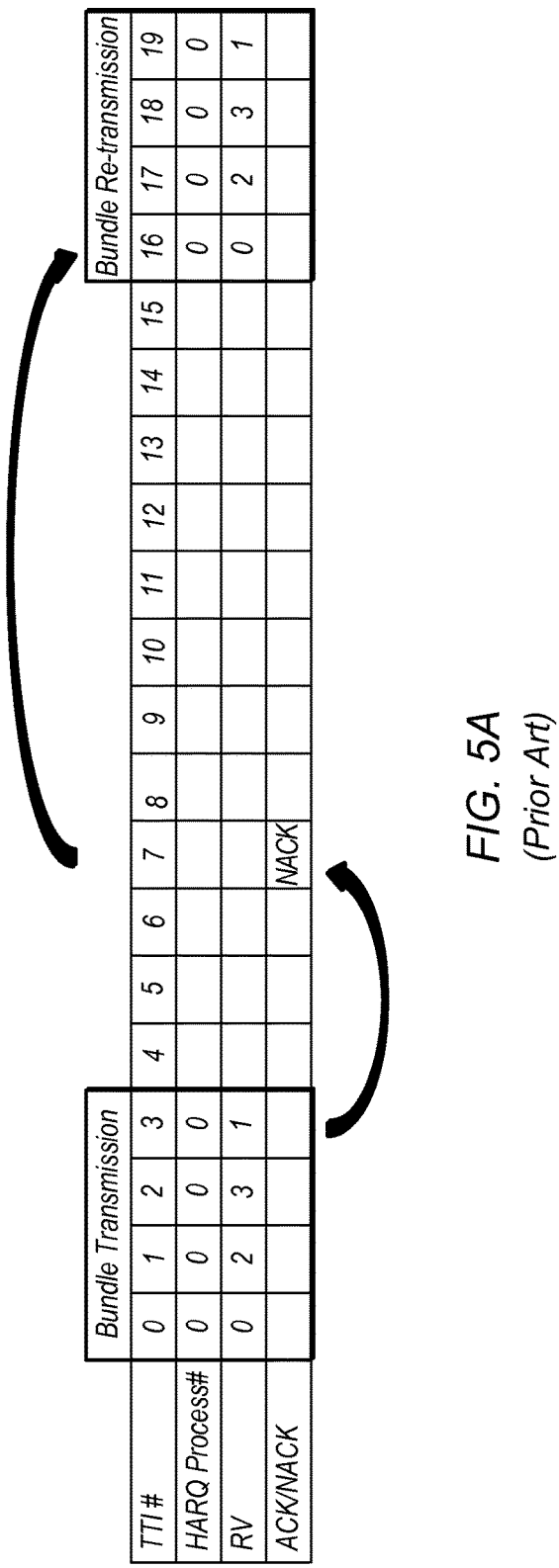
FIG. 5A illustrates traditional TTI bundling, according to the prior art.

FIG. 5A illustrates an example of TTI bundling, i.e., contiguous retransmissions of different redundancy versions of an UL packet. As shown, the UE transmits four different redundancy versions of the data consecutively, these being redundancy versions (RVs) 0, 3, 2 and 1. The base station will send an ACK/NACK feedback after the fourth retransmission, as shown.

LTE Uplink HARQ Procedure

Figure 5B:
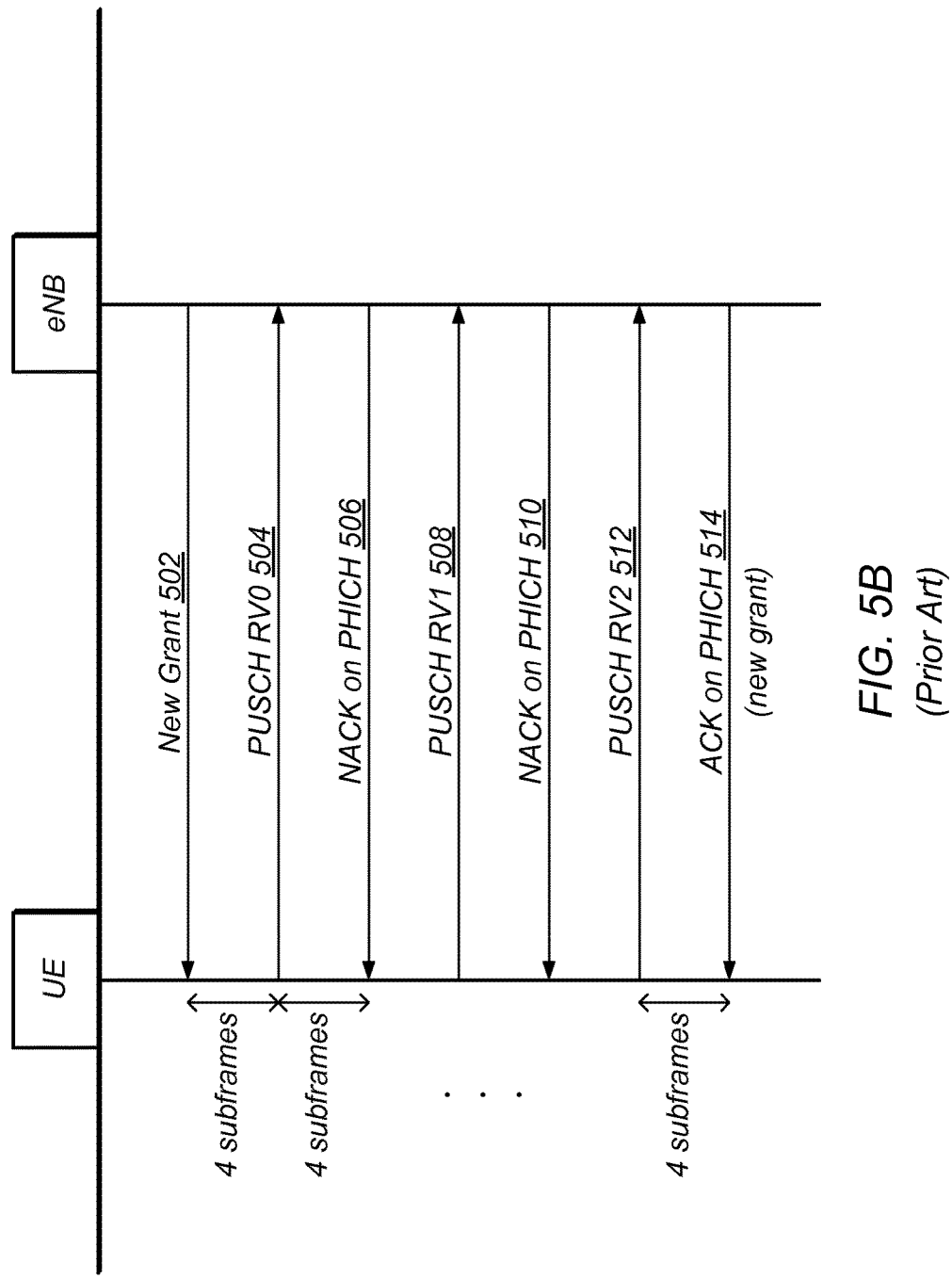
FIG. 5B illustrates an LTE UL HARQ procedure, according to the prior art.
Figure 6:
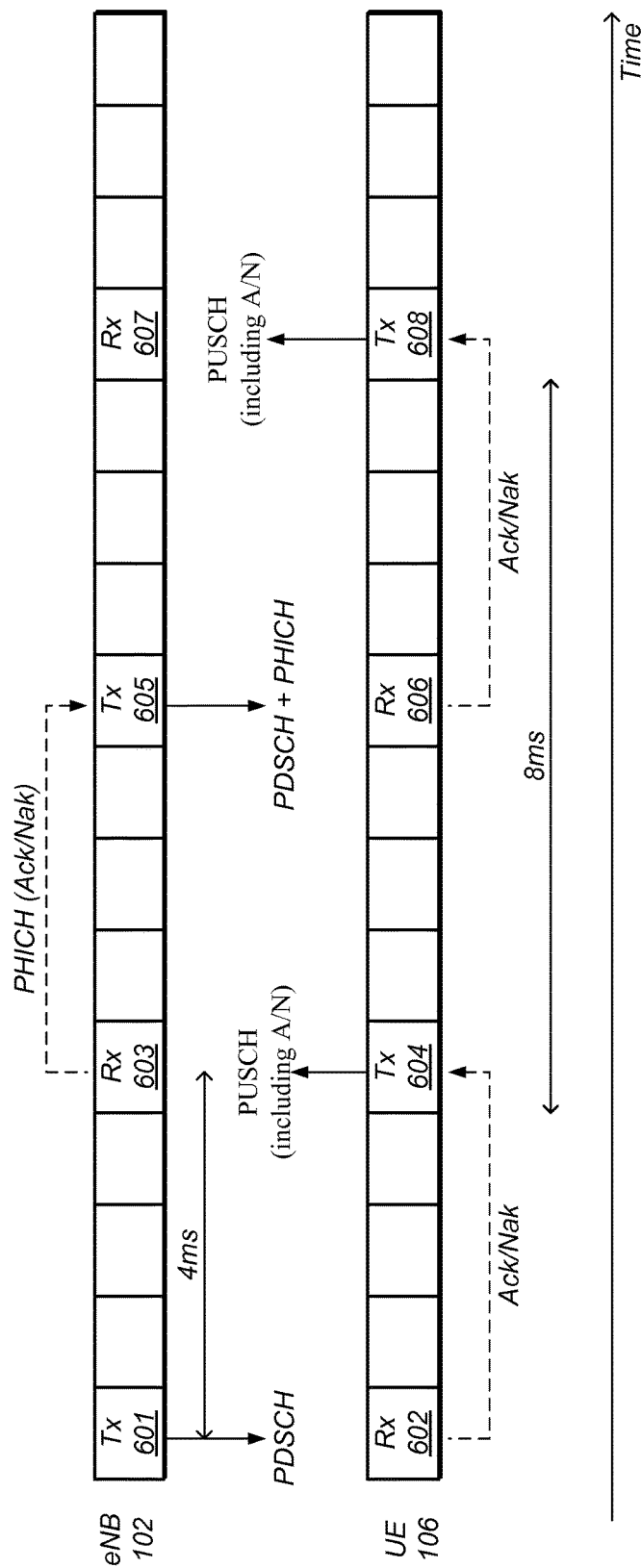
FIG. 6 illustrates an exemplary timeline of a HARQ process, according to some embodiments.

In normal LTE operations, the uplink (UL) procedure may proceed as illustrated in FIG. 5B. A UE (e.g., UE 106) may receive a new uplink grant at 502 on the PDCCH. At 504, 4 sub-frames after receiving the grant, the UE may send data on the PUSCH using redundancy version 0 (RV0). At 506, the UE may receive a NACK on the PHICH 4 sub-frames after sending RV0. In response, at 508, the UE may send RV1 4 sub-frames after receiving the NACK. The procedure continues with the 4 sub-frame spacing at 510 with the UE receiving another NACK from the base station. After another 4 sub-frames, the UE sends RV2 at 512 and receives an ACK on the PHICH at 514 4 sub-frames after sending RV2. In addition, at 514, the UE receives a new grant. The procedure is then repeated with the new grant until the UE receives a NACK. However, a peak current limited devices that may have a reduced duty cycle (e.g., 1 transmission every 8 sub-frames) may not be able to maintain the LTE uplink timeline. Hence, a mechanism is needed to enable UL transmissions in such scenarios and to make sure that the UE may still transmit in the UL without violating the UL timeline, FIG. 6: HARQ Timeline FIG. 6 illustrates an exemplary timeline of a HARQ process, according to some embodiments. As discussed above, a peak current limited device (i.e., a device that has limited battery and/or limited power amplifier capability), such as UE 106, may be unable to transmit continuously in the uplink. In other words, the peak current limited device may operate on a low duty cycle such as 1 transmission (TX) every 8 milliseconds (ms) in a frequency division duplexing (FDD) system and/or 1 TX every 10 ms in a time division duplexing (TDD) system.

In the embodiment illustrated in FIG. 6, transmission of HARQ ACK/NACK on the PUCCH may be aligned with data transmitted on the PUSCH. Thus, as shown, base station 102 (i.e., eNB 102) may transmit data on the PDSCH in sub-frame 601 and UE 106 may receive the data in sub-frame 602. Four sub-frames after receiving the data on the PDSCH the UE may transmit both user data and HARQ ACK/NACK on the PUSCH in sub-frame 604. In other words, the data and control information may be multiplexed on the PUSCH.

Note that in some embodiments, the base station may limit the number of HARQ processes to one in both uplink and downlink. Limiting the HARQ processes to one may allow the peak current limited device to maintain the uplink timeline, which in this instance (e.g., for an FDD system)

may be one transmission every eight sub-frames. Note that for a TDD system, the peak current limited device may maintain the uplink timeline for a single HARQ process by transmitting once every ten sub-frames. One example would be to use type 2 sub-frame configuration 5 as defined by 3GPP TS 36.211. Further, in some embodiments, the base station may offset downlink and uplink HARQ processes by four sub-frames such that PUSCH and PUCCH may be aligned. Consequently, in the downlink, the PHICH and PDSCH may be aligned as well.

Returning to FIG. 6, after sending the user data and HARQ ACK/NACK in sub-frame 604, the UE may not transmit again for the next seven sub-frames (i.e., the next UE transmission may occur at sub-frame 608). However, in the fourth sub-frame after transmission (sub-frame 606), the UE may receive data on the PDSCH and HARQ ACK/NACK on the PHICH sent from the base station at sub-frame 605. Then, at the eighth sub-frame after the prior transmission (i.e., sub-frame 608), the UE may transmit user data and HARQ ACK/NACK on the PUSCH to the base station and the base station may receive the user data and the HARQ ACK/NACK at sub-frame 607. In certain embodiments, such a timeline may allow the UE to conserve transmission power while maintaining the HARQ process timeline.

In some embodiments for a TDD system, after sending the user data and HARQ ACK/NACK, the UE may not transmit again for the next nine sub-frames. However, in the fifth sub-frame after transmission, the UE may receive data on the PDSCH and HARQ ACK/NACK on the PHICH. Then, at the tenth sub-frame after the prior transmission, the UE may transmit user data and HARQ ACK/NACK on the PUSCH.

Figure 7:
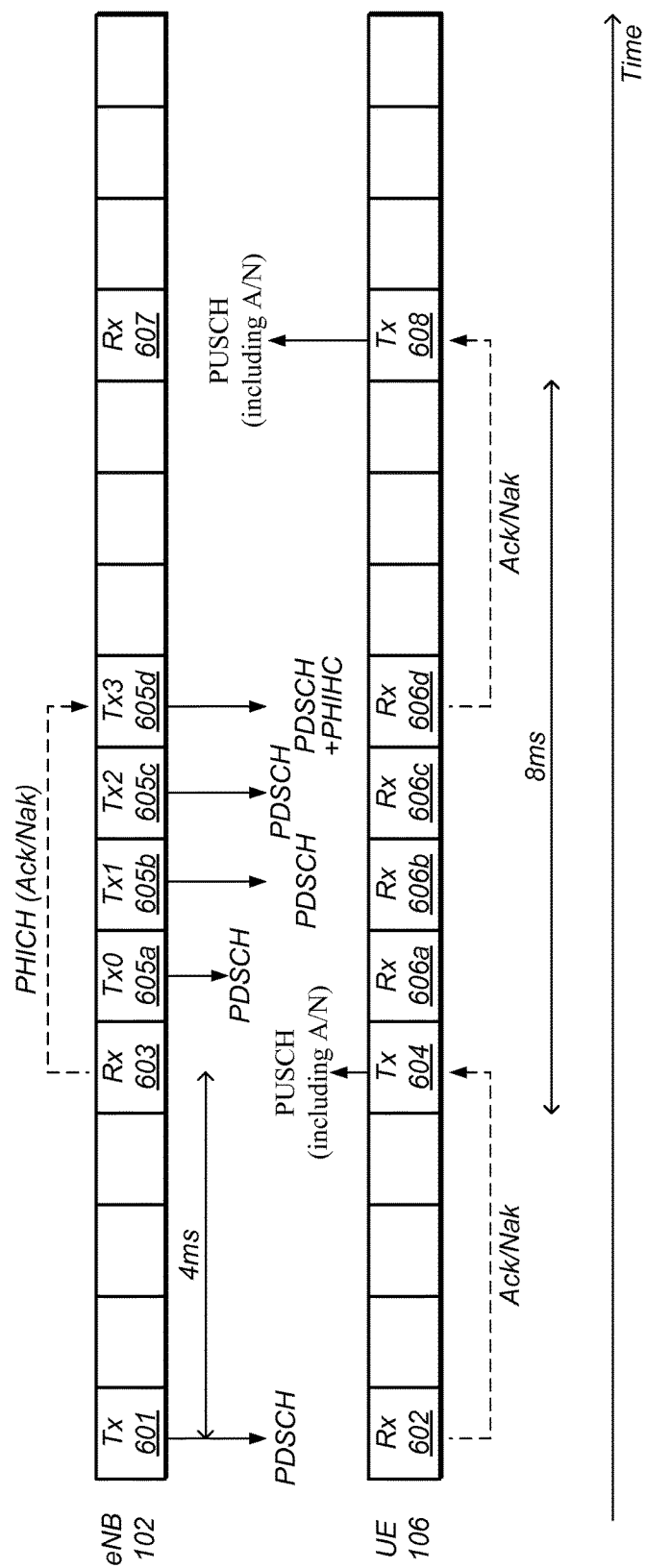
FIG. 7 illustrates an exemplary timeline for improving the downlink budget, according to some embodiments.
Figure 8:
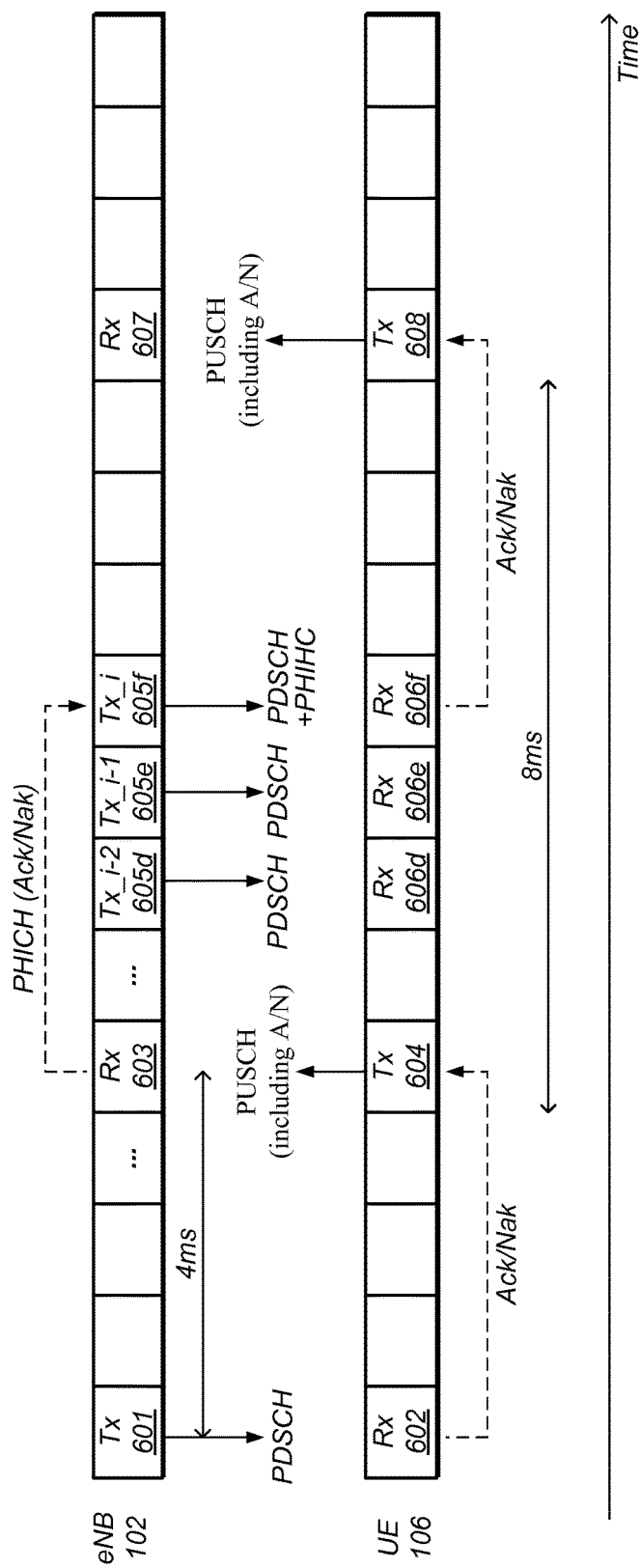
FIG. 8 illustrates another exemplary timeline for improving the downlink budget, according to some embodiments.

FIGS. 7-8: Improved Downlink Budget Timeline

FIG. 7 illustrates an exemplary timeline for improving the downlink budget, according to some embodiments. As shown in FIG. 7, in order to improve the link budget, downlink transmit time interval bundling (TTI-B) as described above may be used without compromising the low duty cycle of a peak current limited device. Note that in some embodiments, the peak current limited device may not support full duplex FDD and may still maintain the low duty cycle.

As shown, the base station (i.e., eNB 102) may transmit data on the PDSCH in sub-frame 601 and the UE (i.e., UE 106) may receive the data in sub-frame 602. As described above with reference to FIG. 6, in order to maintain the uplink timeline, the UE may transmit HARQ ACK/NACK and user data on the PUSCH four sub-frames (i.e., sub-frame 604) after receiving data on the PDSCH sent from the base station at sub-frame 603. Additionally, the UE may then receive data in the next four sub-frames (sub-frames 606a-606d) sent from the base station in consecutive sub-frames 605a-605d. As shown, in the three sub-frames after transmission (i.e., sub-frames 606a-606c), the UE may receive redundancy versions of the data according to TTI-B on the PDSCH. However, in the fourth sub-frame after transmission (i.e., sub-frame 606d), the UE may receive both a redundancy version of the data on the PDSCH and HARQ ACK/NACK on the PHICH as shown in order to maintain the HARQ process timeline. Then, the UE may transmit user data and HARQ ACK/NACK four sub-frames later (i.e., sub-frame 608) according to the HARQ process timeline and the base station may receive the user data and the HARQ ACK/NACK at sub-frame 607.

FIG. 8 illustrates another exemplary timeline for improving the downlink budget, according to some embodiments. As shown in FIG. 8, multiple downlink HARQ processes (i.e., Tx_i-2, Tx_i-1, Tx_i) may be used without compromising the low duty cycle of a peak current limited device. Note that in some embodiments, the peak current limited device may not support full duplex FDD and may still maintain the low duty cycle.

As shown, the base station (i.e., eNB 102) may transmit data on the PDSCH in sub-frame 601 and the UE (i.e., UE 106) may receive the data in sub-frame 602. In order to maintain the uplink timeline, the UE may transmit user data on the PUSCH as well as HARQ ACK/NACK in the fourth sub-frame (sub-frame 604) after receiving data from the base station sent in sub-frame 603. In order to support multiple downlink HARQ processes, the UE may receive data (Tx_i-2, Tx-i-1, and Tx_i) from the base station (sent in sub-frames 605d-605f) in the second, third, and fourth sub-frames (i.e., sub-frames 606d-606f) after transmission. Note that in some embodiments the UE may not be able to transmit data in the first sub-frame after receiving data because of propagation delay. In other words, the UE may not be able to fully decode the downlink (received) transmission within the duration of the sub-frame; hence, the UE may not be ready to transmit in the next sub-frame. Thus, in some embodiments, in order to maintain the uplink timeline, an uplink transmission may not be preceded by a downlink transmission (in the immediately preceding sub-frame). However, it is contemplated that in some embodiments, the uplink transmission may be preceded by a downlink transmission in the immediately preceding sub-frame. Additionally, and similar to the embodiments described in FIGS. 6 and 7, the UE may also receive HARQ ACK/NACK on the PHICH in the fourth sub-frame (sub-frame 606f). The UE may then wait three sub-frames (eight sub-frames after last transmission) before transmitting user data on the PUSCH in sub-frame 608 that may be received by the base station in sub-frame 607.

In some embodiments, the UE may additionally send HARQ ACK/NACK for each HARQ process on the payload of the PUSCH at sub-frame 608. Alternatively, or in addition to, the UE may combine the HARQ ACK/NACK for each HARQ process into a single ACK/NACK carried on the PUSCH and sent at sub-frame 608. In such embodiments, the UE may send an ACK only when each HARQ process is successfully received and may otherwise send a NACK if any of the HARQ processes is not successfully received. Thus, in such instances, the UE may transmit a NACK if any one of the HARQ processes fails, and, in response, the base station may retransmit all the HARQ processes.

Figure 9:
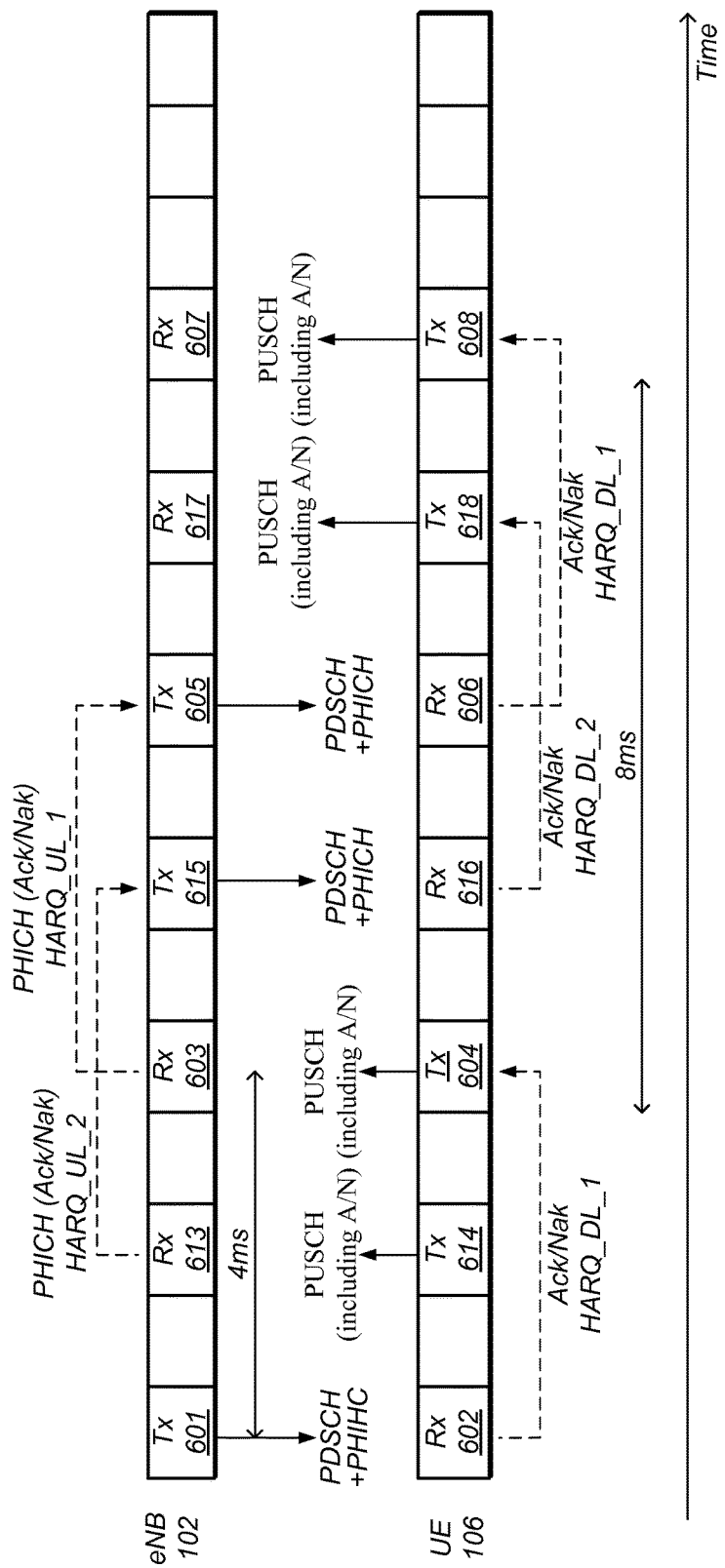
FIG. 9 illustrates an exemplary timeline for multiple uplink HARQ processes, according to some embodiments.
Figure 10:
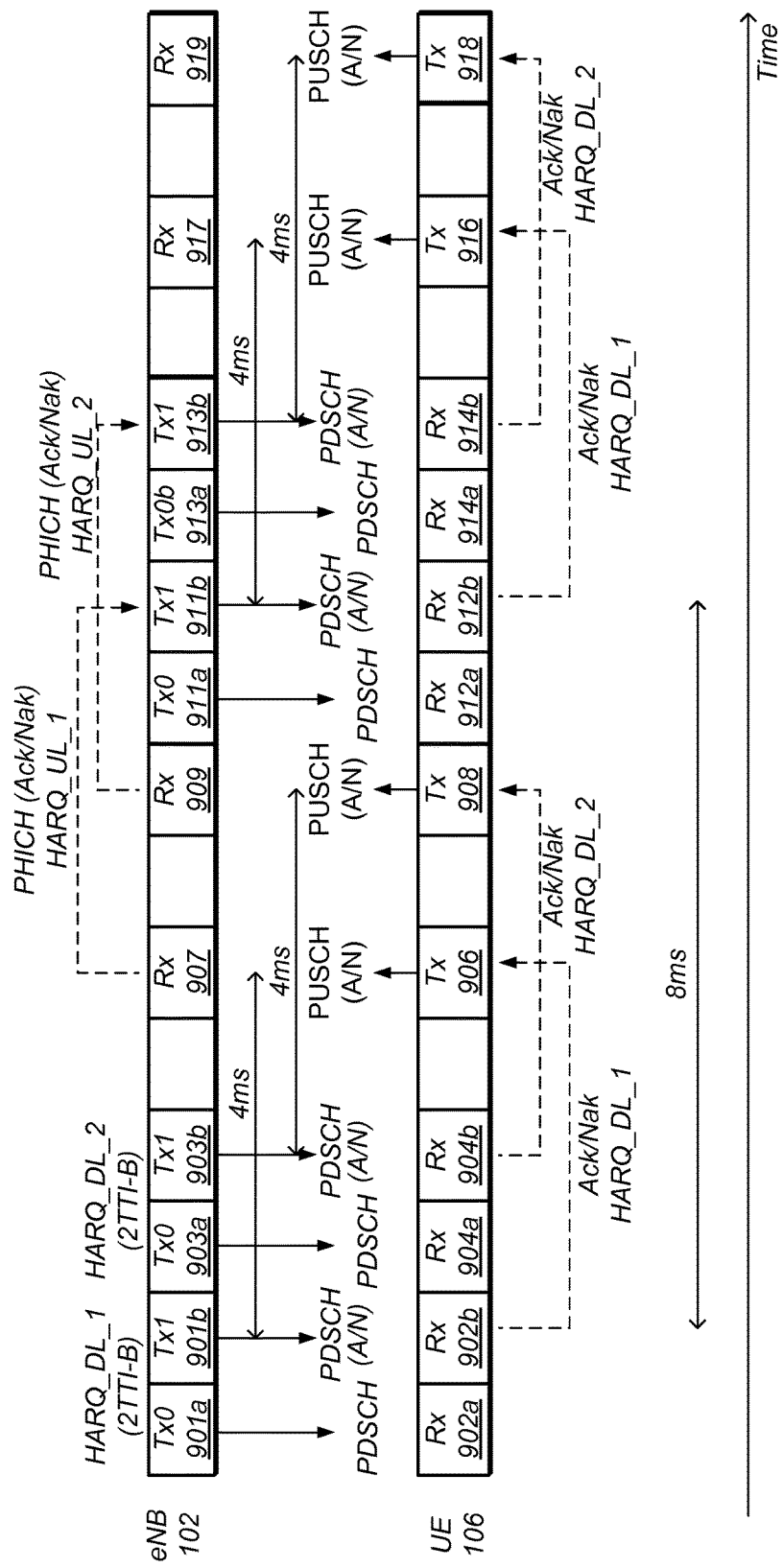
FIG. 10 illustrates an exemplary timeline for multiple uplink and downlink HARQ processes and TTI bundling, according to some embodiments.
Figure 11:
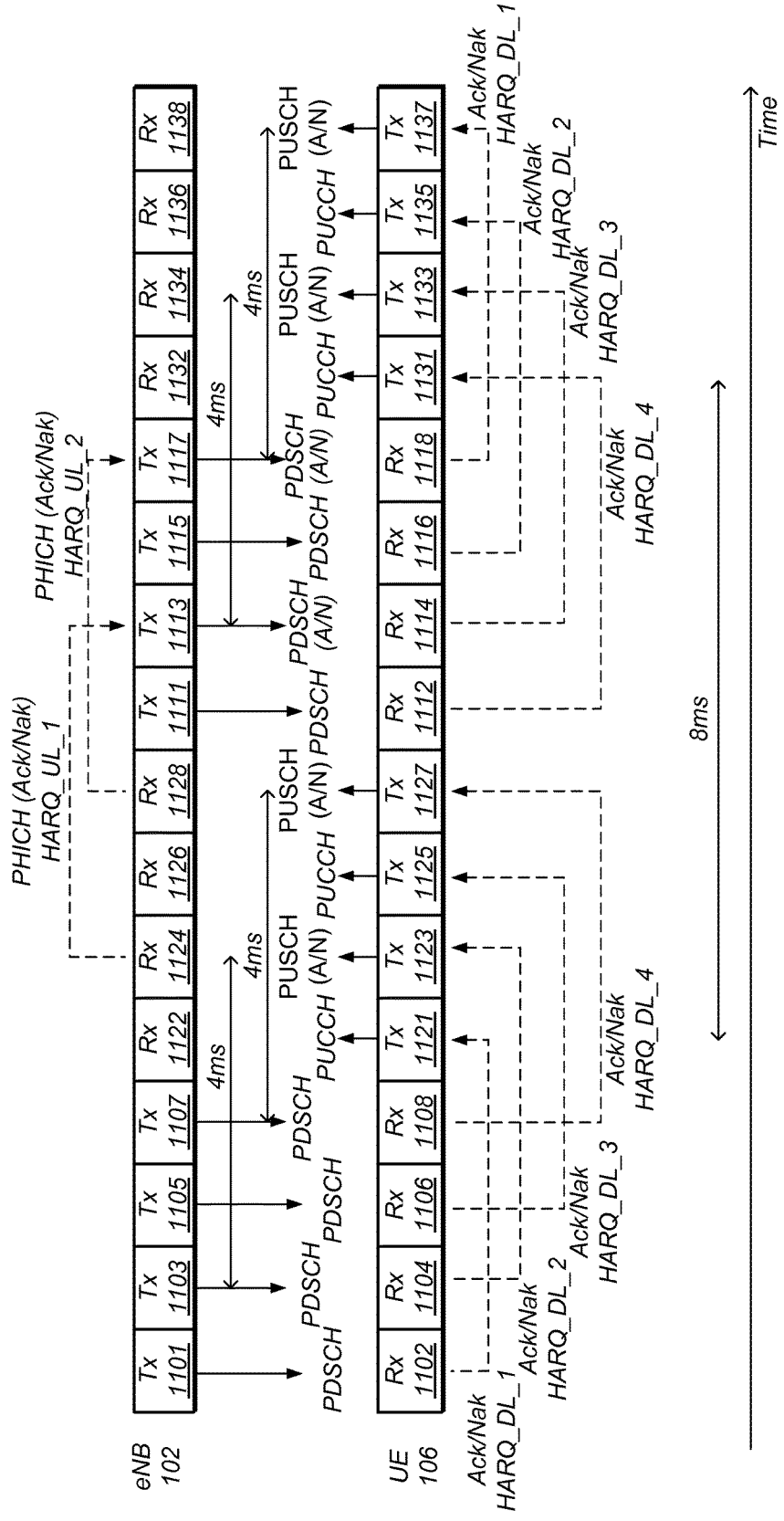
FIG. 11 illustrates an exemplary timeline for multiple downlink and uplink HARQ processes, according to some embodiments.

FIGS. 9-11: Multiple Uplink HARQ Processes

FIGS. 9, 10 and 11 illustrate exemplary timelines for multiple uplink HARQ processes, according to some embodiments. As shown in FIG. 9, in instances when the peak current limited device may have enough power to transmit more than once per duty cycle (e.g., under improved channel conditions such that the power requirements for transmitting are reduced), multiple downlink HARQ processes may be used (i.e., HARQ_1 and HARQ_2). Alternatively, uplink distributed TTI bundling may be used as described below in reference to FIGS. 14 and 15. Note that in some embodiments, the peak current limited device may not be able to simultaneously transmit and receive. In other words, the peak current limited device may still be constrained to half duplex. Further, in some embodiments, to keep the uplink timeline of all UEs that may be in communication with the base station, an uplink transmission may not be preceded by a downlink transmission without a sub-frame in between because the UE may not be able to fully decode a downlink transmission that is preceding an uplink transmission due to propagation delay. Note that it is contemplated that in some embodiments, the uplink transmission may be preceded by a downlink transmission in the immediately preceding sub-frame without compromising the uplink timeline.

As shown in FIG. 9, the base station (i.e., eNB 102) may transmit data on the PDSCH in sub-frame 601 and the UE (i.e., UE 106) may receive the data in sub-frame 602. In order to maintain the uplink timeline, the UE may transmit user data on the PUSCH as well as HARQ ACK/NACK in the fourth sub-frame (sub-frame 604) after receiving data from the base station sent at sub-frame 603. Note that this receive/transmit pair (sub-frame 602, 604, 606, and 608 on the UE side and sub-frame 601, 603, 605, and 607 on the base station side) may be associated with both a first uplink HARQ process and a first downlink HARQ process (i.e., HARQ_DL_1 and HARQ_UL_1). In addition, the UE may have a second uplink HARQ process (HARQ_UL_2) and may transmit user data associated with the second HARQ process via another transmit/receive pair (sub-frame 614, 616, and 618 on the UE side and sub-frame 613, 615, and 617 on the base station side). Thus, the UE may transmit user data on the PUSCH as well as HARQ ACK/NACK (associated with HARQ_DL_2) in the second sub-frame (i.e., sub-frame 614) after receiving data from the base station associated with HARQ_DL_1 at sub-frame 602. In this manner, the UE may maintain the same duty cycle for each HARQ process. In other words, the UE maintains the HARQ timeline of one transmission every eight sub-frames for each HARQ process.

Note that in an embodiment supporting TDD, the UE may support two uplink HARQ processes with a HARQ timeline of one transmission every five sub-frames in accordance with the HARQ timeline for TDD.

In some embodiments, the number of downlink and uplink processes may be equivalent. In other words, the HARQ processes may be symmetric in some embodiments. However, it is envisioned, as further described below, that in some embodiments, the HARQ processes may be asymmetric (e.g., the number of downlink HARQ processes is not equivalent to the number of uplink HARQ processes). Thus, for example, as shown in FIG. 9, there may be two downlink HARQ processes and two uplink HARQ processes. In certain embodiments, the uplink HARQ processes may be limited to two. In some embodiments, this may be due to battery and/or power constraints.

FIG. 10 illustrates an exemplary HARQ timeline supporting multiple uplink HARQ processes and downlink TTI bundling. As shown, the base station (i.e., eNB 102) may send a first TTI bundle (Tx0 and Tx1) for a first downlink HARQ process (HARQ_DL_1) at sub-frames 901a and 901b and the UE (i.e., UE 106) may receive the first transmission of the TTI bundle (Tx0) at sub-frame 902a on the PDSCH. Additionally, the UE may receive the second transmission of the TTI bundle (Tx1) at sub-frame 902b on the PDSCH. As discussed above, a TTI bundle may include multiple redundancy versions of the same data. Thus, in this instance, Tx0 and Tx1 may be the same data encoded with differing versions of redundancy.

In addition, the PDSCH may include an ACK/NACK (A/N) from a previous transmission from the UE. In certain embodiments the ACK/NACK may be sent on the PHICH as described above. In some embodiments, the ACK/NACK may be an aggregated ACK/NACK as described above.

At sub-frames 903a and 903b, the base station may send a second set of TTI bundled transmissions and the UE may receive the transmissions on the PDSCH at sub-frames 904a and 904b. As with the first set of TTI bundled transmissions, the UE may receive ACK/NACK included in the PDSCH from a previous transmission at sub-frame 904b.

The first HARQ process (HARQ_DL_1) may continue at sub-frame 906 (4 sub-frames after receipt of the second transmission of the TTI bundle associated with HARQ_1) and the UE may transmit user data (associated with HARQ_UL_1) and ACK/NACK (A/N) (associated with HARQ_DL_1) on the PUSCH which may be received by the base station at sub-frame 907.

Similarly, the second HARQ process (HARQ_DL_2) may continue at sub-frame 908 and the UE may transmit user data (associated with HARQ_UL_2) and A/N (associated with HARQ_DL_2) on the PUSCH which may be received by the base station at sub-frame 909.

At sub-frames 911a and 911b, and similarly, at sub-frames 913a and 913b, the base station may send TTI bundled transmissions and the UE may receive the transmissions on the PDSCH at sub-frames 912a and 912b, and similarly, sub-frames 914a and 914b. Note that the UE may receive an ACK/NACK associated with HARQ_UL_1 at sub-frame 912b and an ACK/NACK associated with HARQ_UL_2 at sub-frame 914b. The ACK/ANCKs may be included in the PDSCH. The communications may continue as shown. The UE may transmit additional user data and ACK/NACK associated with HARQ_DL_1 and HARQ_DL_2 at sub-frames 916 and 918 which may be received by the base station at sub-frames 917 and 919, respectively.

FIG. 11 illustrates an exemplary HARQ timeline supporting multiple uplink and downlink HARQ processes. As noted above, the uplink and downlink HARQ processes may be symmetric (i.e., equivalent in number) or asymmetric (i.e., not equivalent in number). In some embodiments, the uplink and downlink HARQ processes may be asymmetric because the UE is peak current and/or link budget limited. In other words, the UE may not have enough power to perform transmissions for more than one or two UL HARQ processes.

As shown, a UE (UE 106) may support four downlink HARQ processes (HARQ_DL_1-HARQ_DL_4) and two uplink HARQ processes (HARQ_UL_1 and HARQ_UL_2). Thus, in some embodiments, the UE may transmit or receive in each sub-frame. For example, the base station (eNB 102) may transmit data on the PDSCH at sub-frames 1101, 1103, 1105, and 1107 and the UE may receive the data at sub-frames 1102, 1104, 1106, and 1108, respectively.

As illustrated, the UE may transmit ACK/NACK information on the PUCCH at sub-frames 1121 (received at sub-frame 1122) and 1125 (received at sub-frame 1126). In some embodiments, the UE may support format 1a for the PUCCH while in other embodiments the UE may additionally support format 3 for the PUCCH. Note that format 1a includes on 1 bit for ACK/NACK whereas format 3 may support up to 10 bits for ACK/NACK. Additionally, the UE may transmit user data and ACK/NACK on the PUSCH at sub-frames 1123 (received at sub-frame 1124) and 1125 (received at sub-frame 1126). In other words, the UE may alternate transmitting on the PUSCH and PUCCH depending on whether or not the UE has data to send. Thus, when the UE has data to send, the ACK/NACK may be included in the payload of the PUSCH. Additionally, in some embodiments, the power required to transmit on the PUCCH may be lower than the power required to transmit on the PUSCH. Therefore, the UE may conserve power in some embodiments by transmitting on the PUSCH. Note that, in accordance with the HARQ timeline, respective ACK/NACKs for a HARQ process (uplink or downlink) may be sent four sub-frames after receipt of data associated with the HARQ process.

The signaling may be repeated for a second set of sub-frames as shown. Thus, the base station may transmit data at sub-frames 1111, 1113, 1115, and 1117 (respectively received at the UE in sub-frames 1112, 1114, 1116, and 1118). Note that the base station may include the ACK/NACKs associated with HARQ_UL_1 and HARQ_UL_2 on the PDSCH at sub-frames 1113 and 1117 in accordance with the HARQ timeline. Similarly, the UE may transmit ACK/NACKs on the PUCCH at sub-frames 1131 and 1135 (received by the base station at sub-frames 1132 and 1136, respectively). Further, the UE may transmit user data and ACK/NACKs on the PUSCH at sub-frames 1133 (received by the base station at sub-frame 1134) and 1137 (received by the base station at sub-frame 1138).

Figure 12:
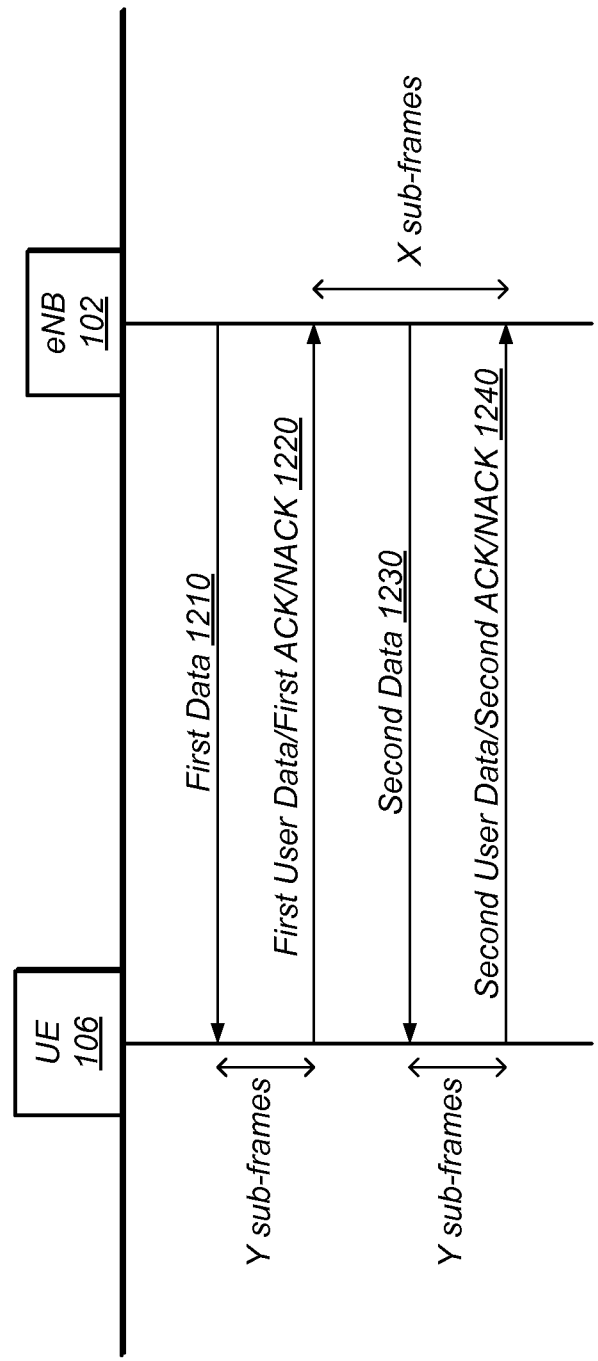
FIG. 12 illustrates a method for HARQ signaling, according to some embodiments.
Figure 13:
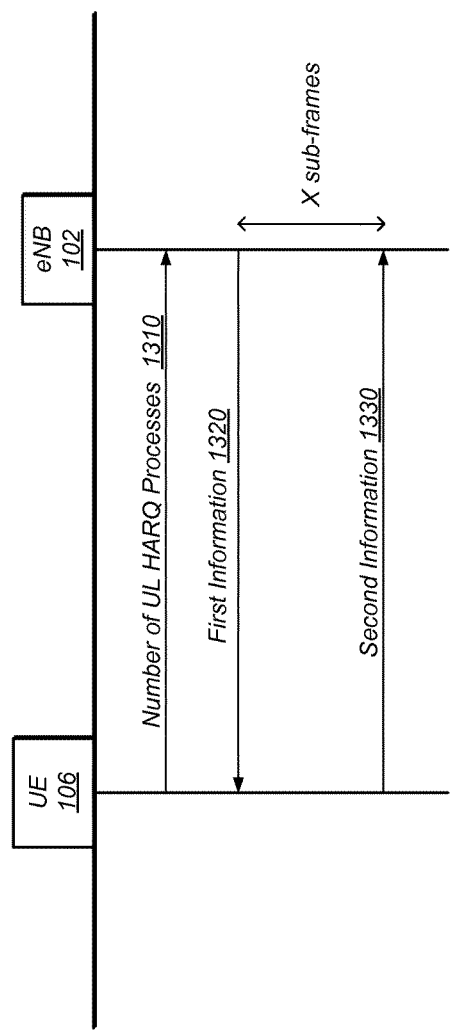
FIG. 13 illustrates a method for HARQ signaling, according to some embodiments.

FIGS. 12-13: Methods for HARQ Signaling

FIGS. 12 and 13 illustrate methods for HARQ signaling according to embodiments. The methods may include the signaling operations between a base station, such as eNB 102, and a user equipment, such as UE 106, shown in FIGS. 12 and 13. Note that the methods may also include any subset of the features, elements and embodiments described above. Thus, in some embodiments the UE may be a peak current limited device and in some embodiments, the UE may have a transmit duty cycle of X sub-frames.

Turning to FIG. 12, at 1210 the UE may receive first data from the base station. The first data may be received on the PDSCH as described in the above Figures.

At 1220, the UE may send first user data and a first ACK/NACK Y sub-frames after receiving the first data from the base station. In some embodiments, X may be two times Y. Further, in some embodiments, Y may be four sub-frames and X may be eight sub-frames. In such embodiments, the UE may be configured to transmit using frequency division duplexing (FDD). Additionally, in some embodiments, Y may be five sub-frames and X may be ten sub-frames and the UE may be configured to transmit using time division duplexing (TDD).

In some embodiments, X may be the sum of Y and Z, where Y is a number of sub-frames between the UE receiving and transmitting and Z is a number of sub-frames between the UE transmitting and receiving. In such embodiments, Y and Z may not be equal.

At 1230, the UE may receive second data from the base station on the PDSCH and, at 1240, the UE may send second user data and a second ACK/NACK Y sub-frames after receiving the second data from the base station and X sub-frames after transmitting the first data at 1220.

In certain embodiments, the first and second user data may be transmitted on the PUSCH and the first and second ACK/NACKs may be transmitted on the PUSCH. In such embodiments, the PUSCH and the PUCCH may be aligned.

In some embodiments, the first data may include first information and the second data may include second information and a third ACK/NACK that may correspond to the first user data. In such embodiments the second information may be received on the PDSCH and the third ACK/NACK may be received on the PHICH and the PDSCH and PHICH may be aligned. Additionally, the PUSCH and PHICH may be offset by X sub-frames.

In some embodiments, the UE may be configured to receive up to Y−1 redundancy versions of the first data in consecutive sub-frames prior to receiving the first data and Y−1 redundancy versions of the second data in consecutive sub-frames prior to receiving the second data. For example, if X is eight sub-frames and Y is four sub-frames, then the UE may be configured to receive up to three redundancy versions of the first/second data in three consecutive sub-frames prior to receiving the first/second data. Note that the first/second data may itself be a different redundancy version that the prior redundancy versions. Thus, the UE may receive up to Y redundancy versions of first/second data in some embodiments.

In one embodiment, the UE may be configured to receive up to Y−1 additional data in consecutive sub-frames prior to receiving the first data and Y−1 additional data in consecutive sub-frames prior to receiving the second data. In other words, the UE may support more than 1 downlink HARQ process in certain embodiments. For example, if X is eight sub-frames and Y is four sub-frames, then the UE may be configured to receive up to three additional data (each data being associated with a different downlink HARQ process) in 3 consecutive sub-frames prior to receiving the first/second data. Note that the first/second data may be associated with a downlink HARQ process. Thus, the UE may support up to Y downlink HARQ processes in some embodiments.

In embodiments in which multiple downlink HARQ processes may be supported, the first/second data may include the first/second ACK/NACK as well as respective ACK/NACKs for each additional downlink HARQ process. Thus, in some embodiments, the ACK/NACK for the HARQ processes may be included in the payload of the PUSCH.

Alternatively, in embodiments in which multiple downlink HARQ processes may be supported, the first/second ACK/NACK may serve as an ACK/NACK for all the downlink HARQ processes. In other words, the ACK/NACK for all the downlink HARQ processes may be aggregated into a single ACK/NACK sent on the PUCCH. In some embodiments, the ACK/NACKs for all the downlink HARQ processes may be NAND together such that if any of the downlink HARQ processes result in a NACK, then the UE may send a NACK and the base station may retransmit all HARQ processes. Alternatively, if all HARQ processes were received successfully, the UE may send a single ACK.

In certain embodiments, the transmit duty cycle of the UE may correspond to a single uplink HARQ process. In such embodiments, the UE may be configured to support multiple uplink HARQ processes. Thus, in some embodiments, the first and second user data may correspond to a first uplink HARQ process and the UE may be further configured to transmit third user data and a third ACK/NACK in a third sub-frame subsequent to receiving third data from the base station X sub-frames prior. The third ACK/NACK may correspond to the third data and the third sub-frame may be two sub-frames after the first sub-frame. Further, the UE may be configured to transmit fourth user data and a fourth ACK/NACK in a fourth sub-frame subsequent to receiving fourth data from the base station X sub-frames prior, The fourth ACK/NACK may correspond to the fourth data and the fourth sub-frame may be X sub-frames after the third sub-frame.

Now, turning to FIG. 13, at 1310 a UE (i.e., UE 106) may communicate to a base station (i.e., eNB 102) a number of uplink (UL) HARQ processes supported by the UE. In some embodiments, the UE may send a message that includes the number of UL HARQ processes supported to the base station. The message may be sent via a medium access control (MAC) layer control element (CE).

In some embodiments, the UE may determine the number of UL HARQ processes supported using at least one metric and send the number of UL HARQ processes supported to the base station. Thus, in some embodiments, the UE may determine available power headroom and compare the available power headroom to a first threshold. If the available power headroom is less than the first threshold, the UE may only support one UL HARQ process. However, if the available power headroom is greater than a second threshold, the UE may support two UL HARQ processes.

Note that in certain embodiments, the UE may report to the base station its power headroom and the base station may determine the number of UL HARQ processes supported by the UE based on the power headroom. In other words, the base station may implicitly determine the number of UL HARQ processes support without any explicit signaling from the UE.

In another embodiment, the at least one metric may include one or more of UL block error ratio (BLER) and UL signal to interference plus noise ratio (SINR). Further, the UE may compare one or more of the at least one metric to a threshold to determine the number of UL HARQ processes supported.

In some embodiments, the number of UL HARQ processes may be equal to the number of DL HARQ processes. In other words, the UL and DL HARQ processes may be symmetric. In some embodiments, the base station may not support ACK/NACK bundling as described above, thus the number of DL processes may be linked to the number of UL processes, i.e., the base station may constrain the UL and DL HARQ processes to be symmetric in number. Note that in such embodiments, the channel conditions may be such that the UE's power may not be limited.

In other embodiments, the number of UL HARQ processes may not be equal to the number of DL HARQ processes. In other words, the UL and DL HARQ processes may be asymmetric. In such embodiments, the UE may be power constrained (e.g., peak current limited) and/or link budget limited. Therefore, as further discussed below, the UE may transmit ACK/NACKs on both the PUSCH and the PUCCH in order to conserve power. Alternatively, or in addition, in some embodiments the UL and DL HARQ processes may be asymmetric in number and the UE may utilize any of ACK/NACK bundling, PUCCH format 3, or multiple ACK/NACKs in the PUSCH as described above.

At 1320, the UE may receive first information from the base station. The first information may be received in at least a first sub-frame. Additionally, the first information may correspond to at least a first downlink (DL) HARQ process and a number of DL HARQ processes may depend upon the number of UL HARQ processes. Further, in some embodiments, the number of DL HARQ processes may also depend upon the DL channel conditions. Thus, if channel conditions are below a first threshold, the first information may include a plurality of redundancy versions of first data and the UE may receive the plurality of redundancy version in consecutive sub-frames. In such embodiments, the first data may be associated with the first DL HARQ process. Further, in some embodiments, the UE may have a transmit duty cycle of X sub-frames and may support only one DL HARQ process and one UL HARQ process. Thus, the base station may send a TTI bundle for the DL HARQ process and the UE, X sub-frames later, may send user data and an ACK/NACK on the PUSCH as described above.

In addition, if channel conditions are above the first threshold, the first information may include a plurality of DL HARQ processes and the UE may receive the plurality of DL HARQ processes in consecutive sub-frames.

At 1330, the UE may send second information to the base station X sub-frames after the first sub-frame. The second information may include a first ACK/NACK associated with the first DL HARQ process. Additionally, in some embodiments, the UE may support format 1a and format 3 for sending ACK/NACKs on the PUCCH.

In embodiments including multiple DL HARQ processes, the UE may send an ACK/NACK corresponding to each DL HARQ process and each corresponding ACK/NACK may be sent X sub-frames after a sub-frame in which each DL HARQ process was received. Thus, in some embodiments, the UE may include a first ACK/NACK for at least one of the plurality of DL HARQ processes on a payload of second data associated with a first UL HARQ process. The second data and the first ACK/NACK may be sent on a physical uplink shared channel (PUSCH). In addition, the UE may send a second ACK/NACK for at least one other of the plurality of DL HARQ processes on a physical uplink control channel (PUCCH) using format 1a or format 3. Note that in some embodiments, a power to transmit on the PUCCH may be lower than a power to transmit on the PUSCH.

Figure 14:
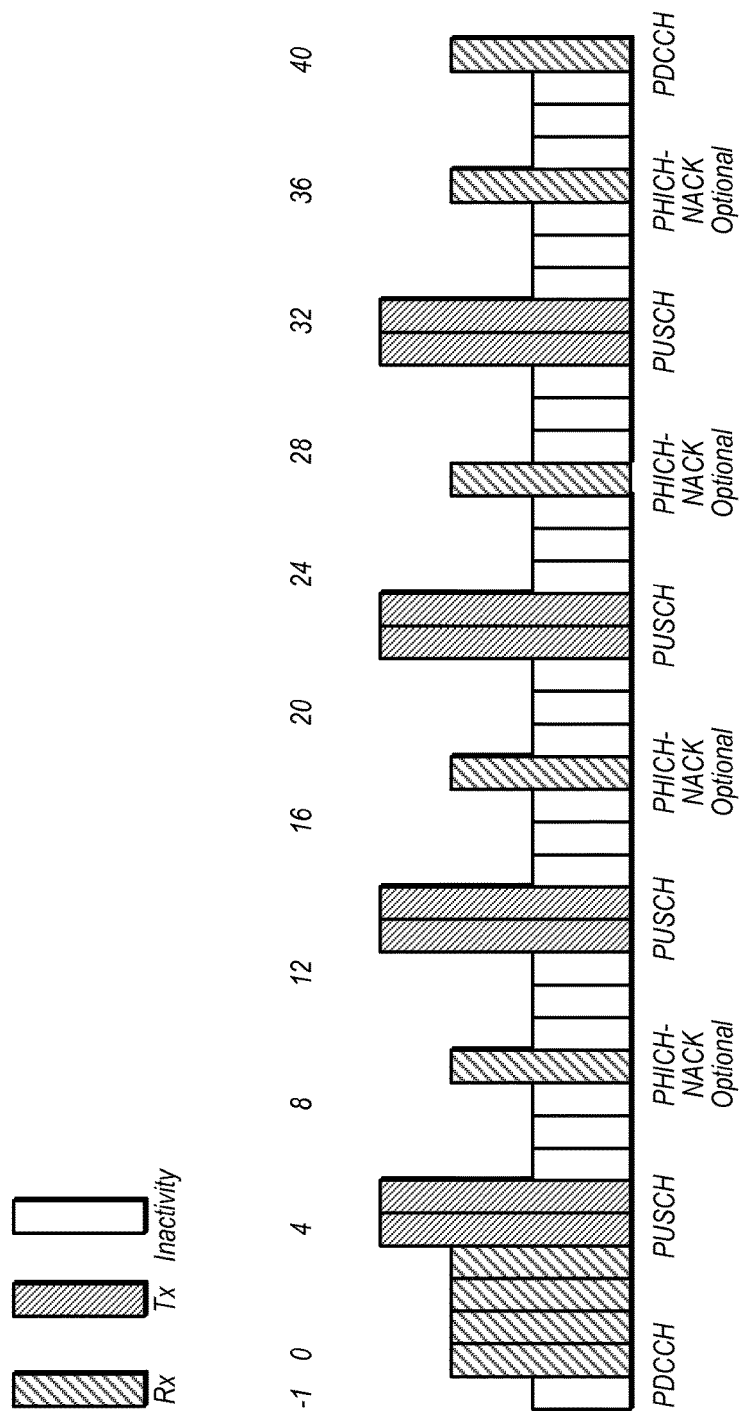
FIG. 14 illustrates an exemplary timeline for TTI bundling and connected discontinuous reception cycle (C-DRX), according to some embodiments.

FIG. 14: HARQ Timeline for VoLTE

FIG. 14 illustrates an exemplary timeline for TTI bundling and connected discontinuous reception cycle (C-DRX), according to some embodiments. In VoLTE (Voice over LTE), a C-DRX cycle of 40 milliseconds is used to make sure that the packet delay budget is obtained. Further, a device that is link budget limited may need to use TTI bundling as described above in reference to FIG. 5A to achieve successful decoding at the base station. However, a peak current limited device may not be able to perform standard TTI bundling since it may not be able to transmit in more than two consecutive sub-frames as required by standard TTI bundling, thus improvements in the field are needed.

Turning to FIG. 14, an exemplary timeline for a C-DRX cycle of 40 milliseconds with distributed TTI bundling is illustrated. As shown, the UE (i.e., UE 106) may receive an uplink grant on PDCCH at sub-frame 0. At sub-frame 4, the UE may send the first of two consecutive transmissions of user data. The transmissions may be sent using different redundancy versions as assigned by the base station (i.e., base station 102). Four sub-frames after the second transmission (i.e., sub-frame 9) the UE may receive a NACK on the PHICH. Note that in between the transmission at sub-frame 5 and the receive at sub-frame 9, the UE may be inactive. Then, at sub-frame 13, the UE may again send two consecutive transmissions. Thus, the UE may transmit 2 times in 9 sub-frames. The UE may then receive another NACK at sub-frame 18 and continue the procedure until the end of the C-DRX cycle at sub-frame 40. Thus, the UE may have transmitted the user data 8 times with various redundancy versions.

In some embodiments, four sub-frames after the first transmission (i.e., sub-frame 8) the UE may receive a NACK on the PHICH. Then, at sub-frame 12 (i.e., four sub-frames after receiving the NACK on the PHICH), the UE may again send two consecutive transmissions. Thus, the UE may transmit 2 times in 8 sub-frames.

In some embodiments, the UE may not monitor the PHICH in between transmissions and may only monitor the PHICH at sub-frame 36 in order to further conserve power. In another embodiment the UE may determine whether a signal-to-interference-plus noise ratio (SINR) for a channel between the base station and the UE is greater than or equal to a threshold. In such embodiments, if the UE determines that the SINR is below the threshold, the UE may not transmit in consecutive sub-frames and may instead transmit in only 1 sub-frame out of 8. However, if the SINR is greater than or equal to the threshold, the UE may continue to transmit in consecutive sub-frames and transmit in 2 sub-frames out of 9 as described above.

Figure 15:
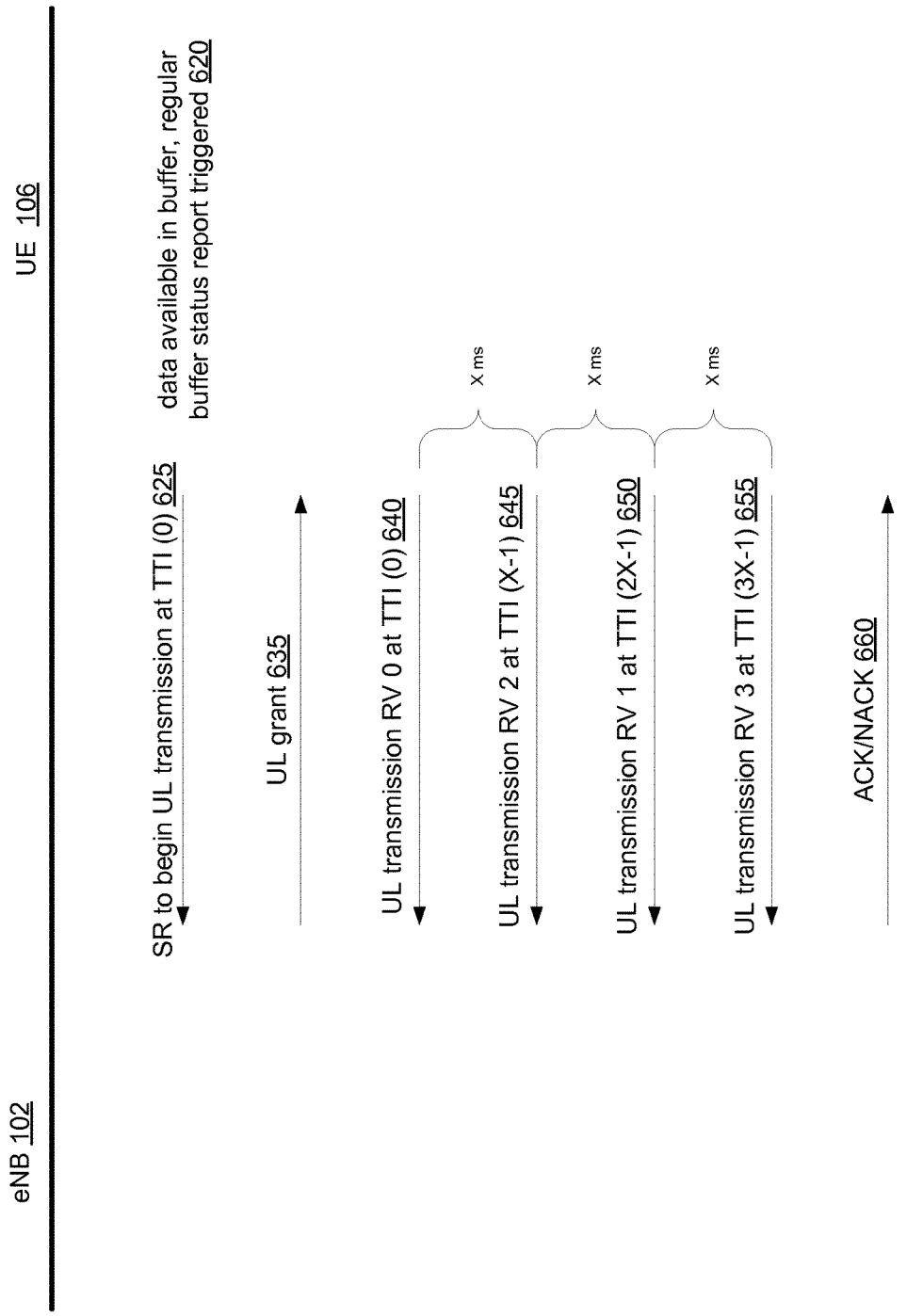
FIG. 15 illustrates a method for distributed TTI bundling, according to some embodiments.

FIGS. 15-16: TTI-Bundling

FIGS. 15 and 16 illustrate a method for distributed TTI bundling, according to some embodiments. The method may include the signaling operations between a base station, such as eNB 102, and a user equipment, such as UE 106, shown in FIG. 15. Note that the method may also include any subset of the features, elements and embodiments described above.

As shown, at 620 the UE may determine that it has data (e.g., first information) available in its buffer and a regular BSR (buffer status report) may be triggered. Thus if the UE has data to transmit to the base station, the BSR is triggered. Here it is presumed that the UE is peak current limited and hence is not able to transmit continuously in the UL. For example, the UE may be only able to perform UL transmissions with a low duty cycle. One example of a low duty cycle is 30% or less. In some embodiments, the UE is capable of transmission during only one out of ten sub-frames, i.e., it can transmit during one sub-frame and remains silent for the next 9 sub-frames, resulting in a duty cycle of 10%. In other embodiments, the UE may be capable of transmission during only one out of 8 sub-frames or one out of 4 sub-frames. Additionally, in certain embodiments, the UE may be capable of transmitting in two or three sub-frames out of a group of sub-frames. For example, the UE may utilize TTI-bundling as described herein and transmit in contiguous sub-frames for a single HARQ process. As another example, the UE may transmit in multiple sub-frames in support of multiple uplink HARQ processes as described herein.

At 625, if the UE does not have UL resources it will send an SR (scheduling request) to the base station). The SR may request to begin a UL transmission at a prescribed time, such as TTI (0). Prior to sending the SR to the base station, e.g., upon joining with the base station, the UE may signal the base station that it is peak current limited, and hence may have a low transmission duty cycle. The base station will then ensure that the SR and SRS transmitted by the UE are aligned. In other words, upon learning that the UE is peak current limited, the base station may ensure that the UE operates such that the periodicity of the SR and SRS are aligned. Alternatively, the UE may explicitly signal the base station that it desires to send one or more sounding reference symbols (SRS) in the same sub-frame as the scheduling request (SR) sent in 625. Sounding reference symbols are transmitted by the UE to the base station in the UL to provide the base station an indication of UL channel quality, and also to convey timing information. Thus, at 625, the UE may transmit the SR and the SRS simultaneously in the same sub-frame. In some embodiments, the duty cycle (periodicity) of SR and SRS is preferably smaller or equal to the duty cycle of the UL transmission as dictated by the peak current limitation.

In response to receiving the SR at 625, the base station may configure the bundle size of the distributed transmit time interval based at least in part on the SRS information, as described below in FIG. 16. In other words, the bundle size information may be dynamically determined by the base station based on current conditions such as the quality of the UL channel between the UE and the base station and/or the power characteristics of the UE. Note that the power characteristics of the UE may be conveyed by the UE to the base station in an RRC message. A length of the distributed transmit time interval (TTI) bundling may effectively correspond to the maximum number of HARQ retransmissions, as reflected in the maxHARQ-Tx parameter.

The bundle size specifies the number of retransmissions of the redundancy versions. Thus, for example, if the base station determines that each redundancy version (RV) should be sent once based on the SRS information, then the bundle size would be four. In another example, if the base station determines that only three redundancy versions are desired to receive the transmission, then the bundle size would be three. As yet another example, if the base station determines that eight redundancy versions are desired, then the four redundancy versions may be each sent twice for a total of eight.

Additionally, in response to receiving the SR at 625, the base station may send an UL grant at 635. The UL grant may be a dynamic and/or persistent UL grant. In some embodiments, the UL grant may be a semi-persistent UL grant such as a SPS (semi-persistent scheduling) UL grant. In other words, the uplink grant received from the base station may include information specifying periodic uplink grants. Thus, in some embodiments, the periodicity of the UL grants may be based on the duty cycle of the UE transmissions and the bundle size.

In response to receiving the UL grant 635, the UE may send data (e.g., first information) via an UL transmission using RV 0 at time zero corresponding to TTI (0) (e.g., at sub-frame 602). In other words, the UE may send the data using a first redundancy version. Then, the UE may wait a period of X milliseconds (X ms) before sending another UL transmission using RV 2 at 645 (e.g., at sub-frame 614 or 606 depending on channel conditions), i.e., the UE may send the data using a different redundancy version. The UE may then proceed to periodically send the remaining transmissions of the bundle every X ms. Thus, at 650, UL transmission of RV 1 may be sent X ms after UL transmission using RV 2. Similarly, at 655, UL transmission of RV 3 may be sent X ms after UL transmission using RV 1.

In some embodiments, the UE may send first and second redundancy versions in consecutive sub-frames and then wait a period of X milliseconds before sending third and fourth redundancy versions. For example, the UE may send RV 0 and RV 2 at sub-frames 0 and 1, respectively and then wait X milliseconds before sending RV 3 and RV 1 in sub-frames X+2 and X+3, respectively.

At 660, the base station may send an acknowledge (ACK) or negative acknowledge (NACK) message. Thus the base station may send only a single ACK/NACK message after all of the RV transmissions of the bundle (the distributed bundle) have been sent by the UE (and received by the base station). This may result in increased transmission efficiency for UEs that are peak current limited. In some embodiments, the UE may not perform retransmission of the UL transmission in response to receiving a NACK. In other words, if none of the RV transmissions of the distributed bundle were received properly by the base station, and the base station sends a negative acknowledge, the UE may not retransmit the first information.

Additionally, if the UL grant at 635 was a persistent or semi-persistent UL grant, such as a SPS UL grant, the UE may begin transmission of new data (e.g., second information) via a new distributed TTI bundled UL transmission X ms after the last UL transmission using RV 3 has been sent at 655. Alternatively, if the UL grant at 635 was dynamic, but not a persistent or semi-persistent UL grant, the base station may send a new UL grant at least X−4 ms after the last retransmission, i.e., within X–4 ms of the UL transmission of RV 3 at 655. Upon receiving the new UL grant, the UE may begin transmission of the new data via the new distributed TTI bundled UL transmission at least X ms after the last UL transmission of RV 3 has been sent at 655.

As described above with respect to FIG. 15, in some embodiments the method may use a form of "distributed" TTI bundling (TTI-B). The actual form of one example of distributed TTI bundling is shown in FIG. 16. For UEs that are peak current and/or power limited and which cannot transmit on consecutive sub-frames, and which hence cannot take advantage of traditional prior art TTI bundling as shown above in FIG. 5A, the distributed TTI bundling method described herein (e.g., described in FIG. 15 and illustrated in FIG. 16) allows such UEs to achieve similar benefits to traditional TTI bundling.

In particular, in the embodiment described above in FIG. 15, the UE may send multiple non-consecutive (and hence distributed) UL redundancy version (RV) transmissions of data (e.g., first information) and does not receive an ACK/NACK feedback from the base station to retransmit until all of the non-consecutive RVs have been sent. In other words, instead of sending multiple UL transmissions of (typically different) redundancy versions in consecutive sub-frames (normal TTI bundling as shown if FIG. 5A), the UE may send multiple UL transmissions of (typically different) redundancy versions over multiple non-consecutive sub-frames. As shown in FIG. 16, a single ACK/NACK is generated by the base station only after all of the redundancy versions have been transmitted. This enables avoidance of violation of the HARQ timeline in the UL.

Thus, in some embodiments, the distributed TTI-B may be defined as follows:

The UE may send the data (e.g., HARQ Process#0) via UL transmissions with different redundancy versions (RVs) every X ms, where X is the periodicity of the retransmission. Thus, as shown in FIG. 16, HARQ Process#0 encoded using redundancy version (RV) 0 may be transmitted by the UE at TTI# (e.g., time) 0. The UE may then wait X sub-frames (e.g., TTI periods), where each sub-frame corresponds to a unit of time such as one millisecond, before sending HARQ Process#0 encoded using RV 2, thus sending the second transmission of the TTI-B in a non-consecutive sub-frame. Further, the UE may wait another X sub-frames prior to sending HARQ Process#0 encoded using RV 3. Similarly, the UE may wait another X sub-frames prior to sending HARQ Process#0 encoded using RV 1. Thus, the TTI-B may be distributed over 3X sub-frames as shown. Additionally, after sending the HARQ Process#0 encoded using RV 3, the UE may receive an ACK/NACK from the base station. As shown, in some embodiments the UE may not retransmit HARQ Process#0 after receiving a NACK. Furthermore, if the UE received a dynamic or persistent UL grant as described above, the UE may transmit data, e.g., HARQ Process #1 X sub-frames after transmitting the final RV version of HARQ Process#0.

In some embodiments X may be the round trip time (RTT) of the HARQ. In current LTE specifications, the HARQ RTT is 8 ms and each TTI is 1 ms. Thus, the RV versions may be sent every 8 ms (i.e., every 8 TTIs or sub-frames). In some embodiments, the X ms used corresponds to the duty cycle imposed by the peak current limitation. For example, in some embodiments X=10 ms, and the RV versions of the distributed TTI-B may be sent every 10 ms (i.e., every 10 TTIs or sub-frames). It is noted that other values of X are also contemplated. In one example implementation, the periodicity X may range between 4-12 ms, among other possible values. Additionally, the periodicity X may correspond to a peak current limitation of the UE. If X is larger than 8 ms, then the RTT could be changed and becomes equal to X. For example, if X=10 ms, then RTT may also be 10, and the number of HARQ processes is 10.

In another embodiment, the bundle size may correspond to the parameter maxHARQ-Tx as defined by an RRC (radio resource control) message provided by the UE to the base station. The maxHARQ-Tx parameter may be determined at least in part based on the current uplink channel quality, as indicated by an SRS received by the base station, as well as the current power limitations of the UE. Thus, the base station may dynamically adjust the bundle size based on the channel condition between the base station and the UE and the current power state of the UE. This dynamic bundle size operation is described in greater detail with respect to FIG. 8. Alternatively, the bundle size may be fixed and may be further prescribed by the RAT. For example, in current LTE specifications, the bundle size is fixed at 4.

The base station may send an ACK/NACK feedback only after the last UL HARQ transmission. However, since the maxHARQ-Tx is reached with the last transmission, a NACK that is received may be ignored by the UE since, similar to normal HARQ, the HARQ buffer is flushed. Thus, the UE may proceed to send a second distributed TTI-B (e.g., starting with HARQProcess#1 transmitted at TTI#4X–1) as shown in FIG. 16.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

Further Embodiments

In some embodiments, a user equipment device (UE), may include at least one antenna, at least one radio, and one or more processors coupled to the at least one radio. The at least one radio may be configured to perform cellular communication using at least one radio access technology (RAT). Additionally, the one or more processors and the at least one radio may be configured to perform voice and/or data communications.

The UE may be configured to communicate to a base station, a number of uplink (UL) hybrid automatic repeat request (HARQ) processes supported by the UE, receive first information from the base station in at least a first sub-frame, and send second information to the base station X sub-frames after the first sub-frame. The first information may correspond to at least a first downlink (DL) HARQ process and a number of DL HARQ processes may depend upon the number of UL HARQ processes. In addition, the second information may comprise a first ACK/NACK associated with the first DL HARQ process.

In some embodiments, the UE, to communicate the number of UL HARQ processes supported by the UE, may be further configured to send a first message to the base station and the first message may comprise the number of UL HARQ processes supported by the UE. In some embodiments, the UE, to send the first message, may be further configured to send the first message via a medium access control (MAC) layer control element (CE).

In some embodiments, the UE, to communicate the number of UL HARQ processes supported by the UE, may be further configured to determine, based on at least one metric, the number of UL HARQ processes supported and send the number of UL HARQ processes supported to the base station. In some embodiments, the at least one metric may comprise power headroom and to determine the number of UL HARQ processes, the UE may compare determined power headroom to a first threshold. In some embodiments, if the determined power headroom is less than the first threshold, the UE may support one UL HARQ process and if the determined power headroom is greater than a second threshold, the UE may support two UL HARQ processes. In some embodiments, the at least one metric may comprise one or more of UL block error ratio (BLER) and UL signal to interference plus noise ratio (SINR).

In some embodiments, the number of UL HARQ processes may be equal to the number of DL HARQ processes. In some embodiments, the number of UL HARQ processes may not be equal to the number of DL HARQ processes. In some embodiments, the number of DL HARQ processes may be further dependent upon DL channel conditions and, in some embodiments, if the DL channel conditions are below a first threshold, the first information may comprise a plurality of redundancy versions of first data. In such embodiments, to receive the first information, the UE may be further configured to receive the plurality of redundancy version in consecutive sub-frames, and the first data may be associated with the first DL HARQ process. In addition, the UE may have a transmit duty cycle of X sub-frames and may support only the first DL HARQ process and a UL HARQ process.

In some embodiments, if the DL channel conditions are above a first threshold, the first information may comprise a plurality of DL HARQ processes. In such embodiments, the UE, to receive the first information, may be further configured to receive the plurality of DL HARQ processes in consecutive sub-frames. In addition, the UE may be further configured to send an ACK/NACK corresponding to each DL HARQ process and each corresponding ACK/NACK may be sent X sub-frames after a sub-frame in which each DL HARQ process was received. In such embodiments, the UE, to send an ACK/NACK corresponding to each DL HARQ process, may be further configured to include a first ACK/NACK for at least one of the plurality of DL HARQ processes on a payload of second data associated with a first UL HARQ process and send a second ACK/NACK for at least one other of the plurality of DL HARQ processes on a physical uplink control channel (PUCCH). The second data and the first ACK/NACK may be sent on a physical uplink shared channel (PUSCH). In addition, a power to transmit on the PUCCH may be lower than a power to transmit on the PUSCH.

In some embodiments, the UE, to send the second information, may be further configured to send the second information on a physical uplink control channel (PUCCH) using format 3.

In some embodiments, a method may include a UE performing communicating, to a base station, a number of uplink (UL) hybrid automatic repeat request (HARQ) processes supported by the UE, receiving first information from the base station in at least a first sub-frame, and sending second information to the base station X sub-frames after the first sub-frame. The first information may correspond to at least a first downlink (DL) HARQ process and a number of DL HARQ processes depends upon the number of UL HARQ processes. The second information may comprise a first ACK/NACK associated with the first DL HARQ process.

In some embodiments, communicating the number of UL HARQ processes supported by the UE may comprise the UE performing sending a first message to the base station and the first message may comprise the number of UL HARQ processes supported by the UE. Additionally, sending the first message may comprise the UE performing sending the first message via a medium access control (MAC) layer control element (CE).

In some embodiments, communicating the number of UL HARQ processes supported by the UE may comprise the UE performing determining, based on at least one metric, the number of UL HARQ processes supported and sending the number of UL HARQ processes supported to the base station. In some embodiments, the at least one metric may comprise power headroom, wherein determining the number of UL HARQ processes may comprise the UE performing comparing determined power headroom to a first threshold. Additionally, if the determined power headroom is less than the first threshold, the UE may support one UL HARQ process and if the determined power headroom is greater than a second threshold, the UE may support two UL HARQ processes. In some embodiments, the at least one metric may comprise one or more of UL block error ratio (BLER) and UL signal to interference plus noise ratio (SINR).

In some embodiments, the number of UL HARQ processes may be equal to the number of DL HARQ processes. In some embodiments, the number of UL HARQ processes may be not equal to the number of DL HARQ processes. In some embodiments, the number of DL HARQ processes may be further dependent upon DL channel conditions. In some embodiments, if the DL channel conditions are below a first threshold, the first information may comprise a plurality of redundancy versions of first data and receiving the first information may comprise the UE performing receiving the plurality of redundancy version in consecutive sub-frames. Additionally, the first data may be associated with the first DL HARQ process. In some embodiments, the UE may have a transmit duty cycle of X sub-frames, and wherein the UE supports only the first DL HARQ process and a UL HARQ process. In some embodiments, if the DL channel conditions are above a first threshold, the first information may comprise a plurality of DL HARQ processes and receiving the first information may comprise the UE performing receiving the plurality of DL HARQ processes in consecutive sub-frames. In such embodiments, the method further may comprise the UE performing sending an ACK/NACK corresponding to each DL HARQ process and each corresponding ACK/NACK may be sent X sub-frames after a sub-frame in which each DL HARQ process was received. In such embodiments, sending an ACK/NACK corresponding to each DL HARQ process may comprise the UE performing including a first ACK/NACK for at least one of the plurality of DL HARQ processes on a payload of second data associated with a first UL HARQ process and sending a second ACK/NACK for at least one other of the plurality of DL HARQ processes on a physical uplink control channel (PUCCH). The second data and the first ACK/NACK may be sent on a physical uplink shared channel (PUSCH) and a power to transmit on the PUCCH may be lower than a power to transmit on the PUSCH.

In some embodiments, sending the second information may comprise the UE performing sending the second information on a physical uplink control channel (PUCCH) using format 3.

In some embodiments, a base station may be configured to perform wireless communication with a wireless device and may comprise a radio and a processing element operatively coupled to the radio.

In some embodiments, the base station may be configured to receive, from a wireless device, a number of uplink (UL) hybrid automatic repeat request (HARQ) processes supported by the wireless device, send first information to the wireless device in at least a first sub-frame, and receive second information to the base station X sub-frames after the first sub-frame. The first information may correspond to at least a first downlink (DL) HARQ process and wherein the second information may comprise a first ACK/NACK associated with the first DL HARQ process. A number of DL HARQ processes may depend upon the number of UL HARQ processes.

In some embodiments, the base station, to receive the number of UL HARQ processes supported by the wireless device, may be further configured to receive a first message from the wireless device and the first message may comprise the number of UL HARQ processes supported by the wireless device. In some embodiments, to receive the first message, the base station may be further configured to receive the first message via a medium access control (MAC) layer control element (CE).

In some embodiments, the base station, to receive the number of UL HARQ processes supported by the wireless device, may be further configured to receive at least one metric from the wireless device and determine, based on the at least one metric, the number of UL HARQ processes supported by the wireless device. The at least one metric may comprise power headroom and to determine the number of UL HARQ processes, the base station may be configured to compare determined power headroom to a first threshold. Additionally, in some embodiments, if the determined power headroom is less than the first threshold, the wireless device may support one UL HARQ process and if the determined power headroom is greater than a second threshold, the wireless device may support two UL HARQ processes. In some embodiments, the at least one metric may comprise one or more of UL block error ratio (BLER) and UL signal to interference plus noise ratio (SINR).

In some embodiments, the number of UL HARQ processes may be equal to the number of DL HARQ processes. In some embodiments, the number of UL HARQ processes may be not equal to the number of DL HARQ processes. In some embodiments, the number of DL HARQ processes may be further dependent upon DL channel conditions. Additionally, if the DL channel conditions are below a first threshold, the first information may comprise a plurality of redundancy versions of first data. Further, to send the first information, the base station may be further configured to send the plurality of redundancy version in consecutive sub-frames and the first data may be associated with the first DL HARQ process. In some embodiments, the wireless device may have a transmit duty cycle of X sub-frames and the wireless device supports only the first DL HARQ process and a UL HARQ process.

In some embodiments, if the DL channel conditions are above a first threshold, the first information may comprise a plurality of DL HARQ processes and to send the first information, the base station may be further configured to send the plurality of DL HARQ processes in consecutive sub-frames. In such embodiments, the base station may be further configured to receive an ACK/NACK corresponding to each DL HARQ process, wherein each corresponding ACK/NACK may be received X sub-frames after a sub-frame in which each DL HARQ process was sent. Further, to receive an ACK/NACK corresponding to each DL HARQ process, the base station may be further configured to receive, on a physical uplink shared channel (PUSCH), a first ACK/NACK for at least one of the plurality of DL HARQ processes on a payload of second data associated with a first UL HARQ process and receive a second ACK/NACK for at least one other of the plurality of DL HARQ processes on a physical uplink control channel (PUCCH).

In some embodiments, to receive the second information, the base station may be further configured to receive the second information on a physical uplink control channel (PUCCH) using format 3.

In some embodiments, a method may comprise a base station performing receiving, from a wireless device, a number of uplink (UL) hybrid automatic repeat request (HARQ) processes supported by the wireless device, sending first information from the base station in at least a first sub-frame, and receiving second information to the base station X sub-frames after the first sub-frame. The first information may correspond to at least a first downlink (DL) HARQ process, a number of DL HARQ processes may depend upon the number of UL HARQ processes, and the second information may comprise a first ACK/NACK associated with the first DL HARQ process.

In some embodiments, a user equipment device (UE), may include at least one antenna, at least one radio, and one or more processors coupled to the at least one radio. The at least one radio may be configured to perform cellular communication using at least one radio access technology (RAT). Additionally, the one or more processors and the at least one radio may be configured to perform voice and/or data communications.

In some embodiments, the UE may have a transmit duty cycle of X sub-frames and may be configured to transmit first user data and a first acknowledge/negative acknowledge (ACK/NACK) in a first sub-frame subsequent to receiving first data from a base station Y sub-frames prior and transmit second user data and a second ACK/NACK in a second sub-frame subsequent to receiving second data from the base station Y sub-frames prior. The first ACK/NACK may correspond to the first data from the base station and X may be greater than Y. The second ACK/NACK may correspond to the second data from the base station and the second sub-frame may be X sub-frames after the first sub-frame.

In some embodiments, X may be two times Y. In some embodiments, Y may be 4 sub-frames and the UE may be further configured to transmit and receive using frequency division duplexing.

In some embodiments, X may be the sum of Y and Z, Y may be a number of sub-frames between receive and transmit and Z may be a number of sub-frames between transmit and receive. In such embodiments, X may be 10 sub-frames and the UE may be further configured to transmit and receive using time division duplexing. In some embodiments, Y and Z may be not equal.

In some embodiments, the first and second user data may be transmitted on a physical uplink shared channel (PUSCH), the first and second ACK/NACKs may be transmitted on a physical uplink control channel (PUCCH), and the PUSCH and PUCCH may be aligned.

In some embodiments, the first data may comprise first information and the second data comprise second information and a third ACK/NACK. The third ACK/NACK may correspond to the first user data. In addition, the first and second user data may be transmitted on a physical uplink shared channel (PUSCH), the first and second ACK/NACKs may be transmitted on a physical uplink control channel (PUCCH), the PUSCH and PUCCH may be aligned, second information may be received on a physical downlink shared channel (PDSCH), the third ACK/NACK may be received on a physical hybrid automatic repeat request (HARD) indicator channel (PHICH), the PDSCH and PHICH may be aligned, and PUCCH and the PHICH may be offset by X sub-frames.

In some embodiments, the UE may be further configured to receive up to Y−1 redundancy versions of the first data in consecutive sub-frames prior to receiving the first data and receive up to Y−1 redundancy versions of the second data in consecutive sub-frames prior to receiving the second data.

In some embodiments, the UE may be further configured to receive up to Y−1 additional data in consecutive sub-frames prior to receiving the first data and receive up to Y−1 additional data in consecutive sub-frames prior to receiving the second data. In addition, the second user data may comprise the second ACK/NACK and respective ACK/NACKS for each of the Y−1 additional data. In some embodiments, the second ACK/NACK serves as an ACK/NACK for the second data and the Y−1 additional data. The second ACK/NACK may be a NACK if the second data or the Y−1 additional data may be not successfully received and the second ACK/NACK may be an ACK if all of the second data and the Y−1 additional data may be successfully received.

In some embodiments, the transmit duty cycle may correspond to using a single HARQ process. Additionally, the UE may be further configured to support two HARQ processes and transmitting first user data and second user data corresponds to a first HARQ process. Further, the UE, for a second HARQ process, may be configured to transmit third user data and a third ACK/NACK in a third sub-frame subsequent to receiving third data from the base station X sub-frames prior, wherein the third ACK/NACK corresponds to the third data and transmit fourth user data and a fourth ACK/NACK in a fourth sub-frame subsequent to receiving fourth data from the base station X sub-frames prior, wherein the fourth ACK/NACK corresponds to the fourth data. The third sub-frame may be two sub-frames after the first sub-frame and the fourth sub-frame may be X sub-frames after the third sub-frame. In some embodiments, the UE may be further configured to not transmit in a next sub-frame after receiving data from the base station.

In some embodiments, a method may include a UE performing transmitting first user data and a first acknowledge/negative acknowledge (ACK/NACK) in a first sub-frame subsequent to receiving first data from a base station Y sub-frames prior and transmitting second user data and a second ACK/NACK in a second sub-frame subsequent to receiving second data from the base station Y sub-frames prior, wherein the second ACK/NACK corresponds to the second data from the base station, and wherein the second sub-frame may be X sub-frames after the first sub-frame. The first ACK/NACK may correspond to the first data from the base station and the UE may have a transmit duty cycle of X sub-frames. In some embodiments X may be greater than Y.

In some embodiments, X may be two times Y. In such embodiments, Y may be 4 sub-frames and the UE may perform transmitting and receiving using frequency division duplexing. Alternatively, X may be 10 sub-frames, wherein the UE performs said transmitting and receiving using time division duplexing. In some embodiments, X may be the sum of Y and Z and Y may be a number of sub-frames between receive and transmit and Z may be a number of sub-frames between transmit and receive. In such embodiments, Y and Z may be not equal.

In some embodiments, transmitting the first user data may comprise transmitting the first user data on a physical uplink shared channel (PUSCH), transmitting the second user data may comprise transmitting the second user data on the PUSCH, transmitting the first ACK/NACK may comprise transmitting the first ACK/NACK on a physical uplink control channel (PUCCH), transmitting the second ACK/NACK may comprise transmitting the second ACK/NACK on the PUCCH, and the PUSCH and PUCCH may be aligned.

In some embodiments, the first data may comprise first information and the second data comprise second information and a third ACK/NACK and the third ACK/NACK may correspond to the first user data. In some embodiments, transmitting the first user data may comprise transmitting the first user data on a physical uplink shared channel (PUSCH), transmitting the second user data may comprise transmitting the second user data on the PUSCH, transmitting the first ACK/NACK may comprise transmitting the first ACK/NACK on a physical uplink control channel (PUCCH), transmitting the second ACK/NACK may comprise transmitting the second ACK/NACK on the PUCCH, and the PUSCH and PUCCH may be aligned. Further, receiving second information may comprise receiving the second information on a physical downlink shared channel (PDSCH) and receiving the third ACK/NACK on a physical hybrid automatic repeat request (HARQ) indicator channel (PHICH), and the PDSCH and PHICH may be aligned. Additionally, PUCCH and the PHICH may be offset by X sub-frames.

In some embodiments, the method further may comprise the UE performing receiving up to Y−1 redundancy versions of the first data in consecutive sub-frames prior to receiving the first data and receiving up to Y−1 redundancy versions of the second data in consecutive sub-frames prior to receiving the second data.

In some embodiments, the method further may comprise the UE performing receiving up to Y−1 additional data in consecutive sub-frames prior to receiving the first data and receiving up to Y−1 additional data in consecutive sub-frames prior to receiving the second data. In some embodiments, the second user data may comprise the second ACK/NACK and respective ACK/NACKS for each of the Y−1 additional data. In some embodiments, the second ACK/NACK may serve as an ACK/NACK for the second data and the Y−1 additional data. In some embodiments, the second ACK/NACK may be a NACK if the second data or the Y−1 additional data may be not successfully received and the second ACK/NACK may be an ACK if all of the second data and the Y−1 additional data may be successfully received.

In some embodiments, the transmit duty cycle of the UE may correspond to a single HARQ process. In such embodiments, the UE may support two HARQ processes and transmitting first user data and transmitting second user data may correspond to a first HARQ process. Additionally, the method further may comprise the UE performing, for a second HARQ process, transmitting third user data and a third ACK/NACK in a third sub-frame subsequent to receiving third data from the base station X sub-frames prior and transmitting fourth user data and a fourth ACK/NACK in a fourth sub-frame subsequent to receiving fourth data from the base station X sub-frames prior, wherein the fourth ACK/NACK corresponds to the fourth data. The third ACK/NACK may correspond to the third data and the third sub-frame may be two sub-frames after the first sub-frame. The fourth sub-frame may be X sub-frames after the third sub-frame.

In some embodiments, a non-transitory computer readable memory medium may store program instructions executable by at least one processor of a user equipment device (UE) to transmit first user data and a first acknowledge/negative acknowledge (ACK/NACK) in a first sub-frame subsequent to receiving first data from a base station Y sub-frames prior and transmit second user data and a second ACK/NACK in a second sub-frame subsequent to receiving second data from the base station Y sub-frames prior. The first ACK/NACK may correspond to the first data from the base station, the UE may have a transmit duty cycle of X sub-frames, and X may be greater than Y. The second ACK/NACK may correspond to the second data from the base station and the second sub-frame may be X sub-frames after the first sub-frame.

In some embodiments, a user equipment device (UE) may include at least one antenna, at least one radio, and one or more processors coupled to the at least one radio. The at least one radio may be configured to perform cellular communication using at least one radio access technology (RAT). Additionally, the one or more processors and the at least one radio may be configured to perform voice and/or data communications.

The UE may have a transmit duty cycle of X sub-frames and may be configured to determine signal-to-interference-plus noise ratio (SINR) for a channel between the UE and a base station and compare the SINR to a threshold. If the SINR is greater than or equal to the threshold, the UE may be configured to transmit, in consecutive sub-frames, a first version and a second version of user data and transmit, in consecutive sub-frames, a third version and a fourth version of user data. Further, the transmission of the third version may occur X+1 sub-frames after transmission of the first version. If the SINR is less than the threshold, the UE may be configured to transmit the first version of the user data in a first sub-frame and transmit the second version of the user data in a second sub-frame. The second sub-frame may occur X sub-frames after the first sub-frame.

In some embodiments, if the SINR is greater than or equal to the threshold, the UE may be further configured to receive a first acknowledge/negative acknowledge (ACK/NACK) from the base station Y sub-frames after transmitting the second version of the user data and receive a second ACK/NACK Y sub-frames after transmitting the fourth version of the user data. Additionally, if the SINR is less than the threshold, the UE may be further configured to receive the first ACK/NACK from the base station Y sub-frames after transmitting the first version of the user data and receive the second ACK/NACK Y sub-frames after transmitting the second version of the user data. In some embodiments, X may be eight sub-frames and Y may be four sub-frames.

In some embodiments, if the SINR is greater than or equal to the threshold, the UE may be further configured to enter a connected discontinuous reception cycle (C-DRX) in between consecutive transmissions and if the SINR is less than the threshold, the UE may be further configured to enter the C-DRX in between transmissions. Further, the UE may be further configured to receive a first acknowledge/negative acknowledge (ACK/NACK) from the base station Y sub-frames from an end of the C-DRX. In some embodiments, the C-DRX may comprise forty sub-frames. In some embodiments, Y may be four sub-frames.

In some embodiments, a method may comprise a UE performing determining signal-to-interference-plus noise ratio (SINR) for a channel between the UE and a base station and comparing the SINR to a threshold. If the SINR is greater than or equal to the threshold, the UE may perform transmitting, in consecutive sub-frames, a first version and a second version of user data, wherein the UE may have a transmit duty cycle of X sub-frames and transmitting, in consecutive sub-frames, a third version and a fourth version of user data. The third version may occur X+1 sub-frames after transmission of the first version. If the SINR is less than the threshold, the UE may perform transmitting the first version of the user data in a first sub-frame and transmitting the second version of the user data in a second sub-frame, wherein the second sub-frame occurs X sub-frames after the first sub-frame.

In some embodiments, if the SINR is greater than or equal to the threshold, the UE may perform receiving a first acknowledge/negative acknowledge (ACK/NACK) from the base station Y sub-frames after transmitting the second version of the user data and receiving a second ACK/NACK Y sub-frames after transmitting the fourth version of the user data. Further, if the SINR is less than the threshold, the UE may perform receiving the first ACK/NACK from the base station Y sub-frames after transmitting the first version of the user data and receiving the second ACK/NACK Y sub-frames after transmitting the second version of the user data. In some embodiments, X may be eight sub-frames and Y may be four sub-frames.

In some embodiments, if the SINR is greater than or equal to the threshold, the UE may perform entering a connected discontinuous reception cycle (C-DRX) in between consecutive transmissions and if the SINR is less than the threshold, the UE may perform entering the C-DRX in between transmissions. Additionally, the UE may perform receiving a first acknowledge/negative acknowledge (ACK/NACK) from the base station Y sub-frames from an end of the C-DRX. In some embodiments, the C-DRX may comprise forty sub-frames. In some embodiments, Y may be four sub-frames.

In some embodiments, a non-transitory computer readable memory medium may store program instructions executable by at least one processor of a user equipment device (UE) to determine signal-to-interference-plus noise ratio (SINR) for a channel between the UE and a base station and compare the SINR to a threshold. If the SINR is greater than or equal to the threshold, the program instructions may be further executable to transmit, in consecutive sub-frames, a first version and a second version of user data, wherein the UE may have a transmit duty cycle of X sub-frames and transmit, in consecutive sub-frames, a third version and a fourth version of user data. The transmission of the third version may occur X+1 sub-frames after transmission of the first version. If the SINR is less than the threshold, the program instructions may be further executable to transmit the first version of the user data in a first sub-frame and transmit the second version of the user data in a second sub-frame. The second sub-frame may occur X sub-frames after the first sub-frame.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform voice and/or data communications;
   wherein the one or more processors are configured to cause the UE to:
      communicate, to a base station, a number of uplink (UL) hybrid automatic repeat request (HARQ) processes supported by the UE;
      receive first information from the base station in at least a first sub-frame, wherein the first information corresponds to at least a first downlink (DL) HARQ process, wherein a number of DL HARQ processes depends upon the number of UL HARQ processes supported by the UE, wherein if DL channel conditions are below a first threshold, the first information comprises a plurality of redundancy versions of first data associated with the first DL HARQ process, and wherein the plurality of redundancy versions are received in consecutive sub-frames; and
      transmit second information to the base station X sub-frames after the first sub-frame, wherein the second information comprises a first acknowledgement/negative acknowledgment (ACK/NACK) associated with the first DL HARQ process, wherein X is less than or equal to 12.

2. The UE of claim 1,
   wherein to communicate the number of UL HARQ processes supported by the UE, the one or more processors are further configured to cause the UE to:
      transmit a first message to the base station, wherein the first message comprises the number of UL HARQ processes supported by the UE.

3. The UE of claim 1,
   wherein to communicate the number of UL HARQ processes supported by the UE, the one or more processors are further configured to cause the UE to:
      determine, based on at least one metric, the number of UL HARQ processes supported by the UE; and
      transmit the number of UL HARQ processes supported by the UE to the base station.

4. The UE of claim 1,
   wherein the number of UL HARQ processes supported by the UE are equal to the number of DL HARQ processes.

5. The UE of claim 1,
   wherein the number of UL HARQ processes supported by the UE are not equal to the number of DL HARQ processes.

6. The UE of claim 1,
   wherein the number of DL HARQ processes are further dependent upon DL channel conditions.

7. The UE of claim 1,
   wherein if the DL channel conditions are above the first threshold, the first information comprises a plurality of DL HARQ processes, wherein to receive the first information, the one or more processors are further configured to cause the UE to receive the plurality of DL HARQ processes in consecutive sub-frames;
   wherein the one or more processors are configured to cause the UE to:
      transmit an ACK/NACK corresponding to each DL HARQ process, wherein each corresponding ACK/NACK is sent X sub-frames after a sub-frame in which each DL HARQ process was received.

8. An apparatus comprising:
   a memory; and
   a processing element in communication with the memory, wherein the processing element is configured to:
      communicate, to a base station, a number of supported uplink (UL) hybrid automatic repeat request (HARQ) processes;
      receive first information from the base station in at least a first sub-frame, wherein the first information corresponds to at least a first downlink (DL) HARQ process, wherein a number of DL HARQ processes depends upon the number of supported UL HARQ processes, wherein if DL channel conditions are below a first threshold, the first information comprises a plurality of redundancy versions of first data associated with the first DL HARQ process, and wherein the plurality of redundancy versions are received in consecutive sub-frames; and
      generate instructions to transmit second information to the base station X sub-frames after the first sub-frame, wherein the second information comprises a first acknowledgement/negative acknowledgment (ACK/NACK) associated with the first DL HARQ process, wherein X is less than or equal to 12.

9. The apparatus of claim 8,
   wherein to communicate the number of supported UL HARQ processes, the processing element is further configured to:
      generate instructions to transmit a first message to the base station, wherein the first message comprises the number of supported UL HARQ processes.

10. The apparatus of claim 8,
    wherein to communicate the number of supported UL HARQ processes, the processing element is further configured to:
       determine, based on at least one metric, the number of supported UL HARQ processes; and
       generate instructions to transmit the number of supported UL HARQ processes to the base station.

11. The apparatus of claim 8,
    wherein the number of supported UL HARQ processes are equal to the number of DL HARQ processes.

12. The apparatus of claim 8,
wherein the number of supported UL HARQ processes are not equal to the number of DL HARQ processes.

13. The apparatus of claim 8,
wherein the number of DL HARQ processes are further dependent upon DL channel conditions.

14. The apparatus of claim 8,
wherein if the DL channel conditions are above the first threshold, the first information comprises a plurality of DL HARQ processes, wherein to receive the first information, the processing element is further configured to receive the plurality of DL HARQ processes in consecutive sub-frames;
wherein the processing element is configured to:
generate instructions to transmit an ACK/NACK corresponding to each DL HARQ process, wherein each corresponding ACK/NACK is sent X sub-frames after a sub-frame in which each DL HARQ process was received.

15. A non-transitory computer readable memory medium storing program instructions executable by at least one processor of a user equipment device (UE) to:
communicate, to a base station, a number of supported uplink (UL) hybrid automatic repeat request (HARQ) processes;
receive first information from the base station in at least a first sub-frame, wherein the first information corresponds to at least a first downlink (DL) HARQ process, wherein a number of DL HARQ processes depends upon the number of supported UL HARQ processes, wherein if DL channel conditions are below a first threshold, the first information comprises a plurality of redundancy versions of first data associated with the first DL HARQ process, and wherein the plurality of redundancy versions are received in consecutive sub-frames; and
generate instructions to transmit second information to the base station X sub-frames after the first sub-frame, wherein the second information comprises a first acknowledgement/negative acknowledgment (ACK/NACK) associated with the first DL HARQ process, wherein X is less than or equal to 12.

16. The non-transitory computer readable memory medium of claim 15,
wherein to communicate the number of supported UL HARQ processes, the program instructions are further executable to:
generate instructions to transmit a first message to the base station, wherein the first message comprises the number of supported UL HARQ processes.

17. The non-transitory computer readable memory medium of claim 15,
wherein to communicate the number of supported UL HARQ processes, the program instructions are further executable to:
determine, based on at least one metric, the number of supported UL HARQ processes; and
generate instructions to transmit the number of supported UL HARQ processes to the base station.

18. The non-transitory computer readable memory medium of claim 15,
wherein the number of DL HARQ processes are further dependent upon DL channel conditions.

19. The non-transitory computer readable memory medium of claim 15,
wherein the number of supported UL HARQ processes are equal to the number of DL HARQ processes.

20. The non-transitory computer readable memory medium of claim 15,
wherein the number of supported UL HARQ processes are not equal to the number of DL HARQ processes.

* * * * *